US006688755B2

(12) United States Patent
O'Meara

(10) Patent No.: US 6,688,755 B2
(45) Date of Patent: *Feb. 10, 2004

(54) LASER LIGHTING SYSTEM

(76) Inventor: James C. O'Meara, 3811 W. 72nd Ct., Anchorage, AK (US) 99502

( * ) Notice: Subject to any disclaimer, the term of this patent is extended or adjusted under 35 U.S.C. 154(b) by 114 days.

This patent is subject to a terminal disclaimer.

(21) Appl. No.: 09/935,629

(22) Filed: Aug. 24, 2001

(65) Prior Publication Data

US 2002/0105805 A1 Aug. 8, 2002

Related U.S. Application Data

(63) Continuation-in-part of application No. 09/545,876, filed on Apr. 7, 2000, now Pat. No. 6,280,057, which is a division of application No. 09/212,253, filed on Dec. 16, 1998, now Pat. No. 6,163,247, which is a continuation-in-part of application No. 09/149,180, filed on Sep. 8, 1998, now Pat. No. 6,007,219, which is a continuation-in-part of application No. 08/992,384, filed on Dec. 17, 1997, now Pat. No. 6,041,367.

(51) Int. Cl.[7] .................................................. F21K 2/00
(52) U.S. Cl. ..................... 362/259; 362/269; 362/271; 362/279; 362/321; 362/324
(58) Field of Search ................................. 362/259, 253, 362/119, 269, 271, 279, 321, 324, 157

(56) References Cited

U.S. PATENT DOCUMENTS

| 3,710,098 A | 1/1973 | Walden | 240/49 |
|---|---|---|---|
| 3,866,032 A | 2/1975 | Veres | 240/1.2 |
| 4,185,891 A | 1/1980 | Kaestner | 350/167 |
| 4,291,294 A | 9/1981 | Chase | 340/26 |
| 4,554,543 A | 11/1985 | Wyatt et al. | 340/948 |
| 4,700,912 A | 10/1987 | Corbett | 244/63 |
| 4,707,696 A | 11/1987 | Task et al. | 340/954 |
| 4,862,164 A | 8/1989 | Croley et al. | 340/952 |
| 5,531,402 A | 7/1996 | Dahl | 244/75 R |
| 5,584,137 A | 12/1996 | Teetzel | 42/103 |
| 5,593,114 A | 1/1997 | Ruhl | 244/183 |
| 5,909,062 A * | 6/1999 | Krietzman | 307/64 |
| 6,007,219 A * | 12/1999 | O'Meara | 362/259 |
| 6,431,734 B1 * | 8/2002 | Brown et al. | 362/259 |

FOREIGN PATENT DOCUMENTS

| EP | 283441 | 9/1988 |
|---|---|---|
| GB | 2202980 | 10/1988 |
| WO | WO 92/04232 | 3/1992 |

* cited by examiner

*Primary Examiner*—Laura K. Tso
(74) *Attorney, Agent, or Firm*—Richard C. Litman

(57) ABSTRACT

A laser lighting system which employs employ visible and reflective laser beam lighting sources to provide illumination of airport runways and taxiways, preferred approach and departure routes, seaplane base landing areas, marine waterways, as well as to assist in search and rescue operations. The lighting system includes handheld laser lighting units or flares particularly useful for search and which have an optic which emits a laser beam for generating a laser line which is uniformly illuminated from end to end. The handheld laser lighting units may have a pistol grip housing or a cylindrical housing, and may feature either a trigger switch, a plunger switch, or a rotary switch. The handheld laser lighting units are battery powered, and include waterproofing seals for protection from the elements.

19 Claims, 32 Drawing Sheets

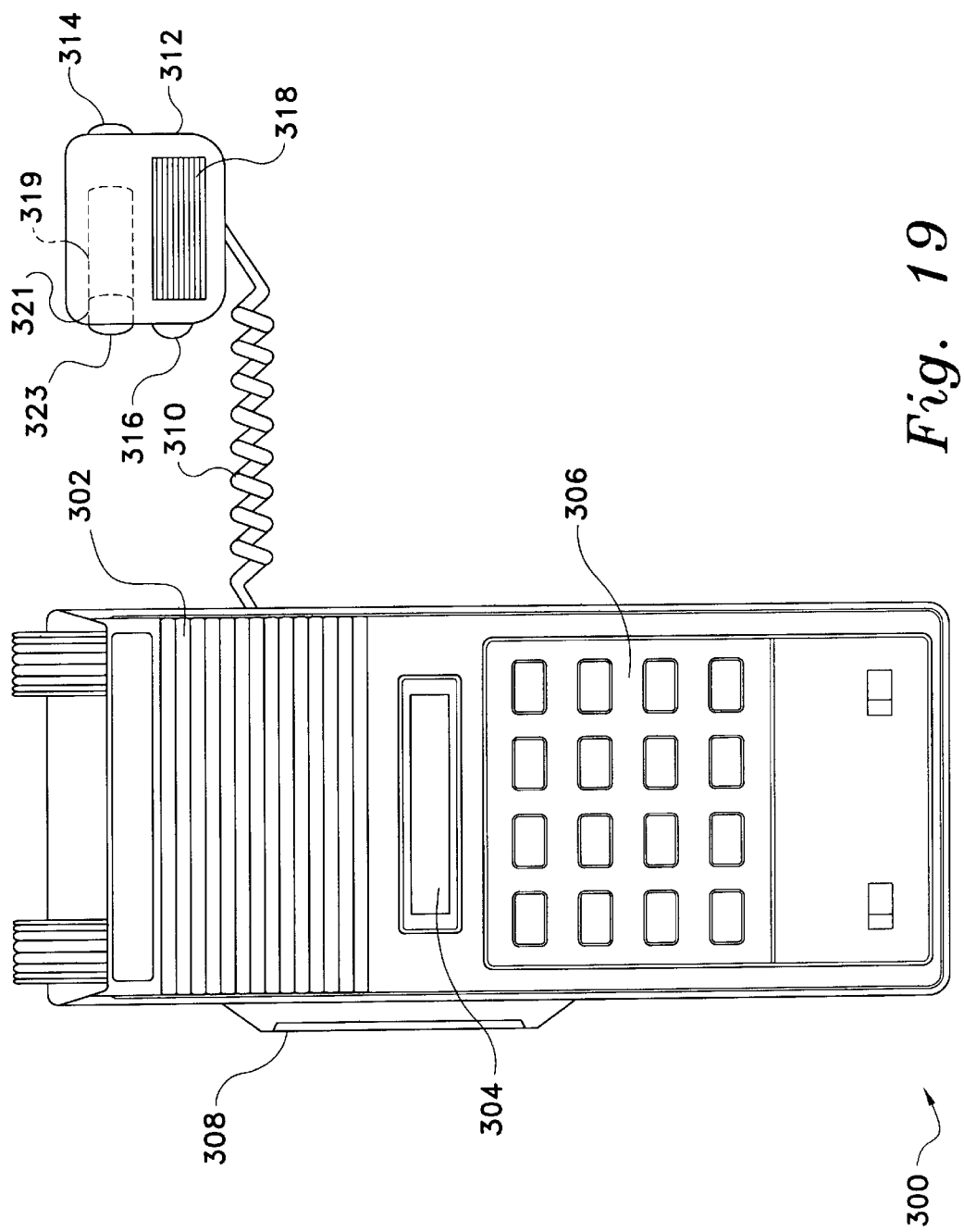

LASER LIGHTING SYSTEM

CROSS-REFERENCE TO RELATED APPLICATIONS

This is a continuation-in-part of a prior application Ser. No. 09/545,876, filed Apr. 7, 2000 now U.S. Pat. No. 6,280,057, which is a divisional of application Ser. No. 09/212,253, filed Dec. 16, 1998, now U.S. Pat. No. 6,163,247, which is a continuation-in-part of application Ser. No. 09/149,180, filed on Sep. 8, 1998, now U.S. Pat. No. 6,007,219, which is a continuation-in-part of application Ser. No. 08/992,384, filed on Dec. 17, 1997, now U.S. Pat. No. 6,041,367.

BACKGROUND OF THE INVENTION

1. Field of the Invention

The present invention relates to lighting sources which employ laser beams to provide illumination of airport runways and taxiways, preferred approach and departure routes, helipads, seaplane base landing areas, marine waterways, as well as lighting sources to assist in search and rescue operations.

2. Description of the Related Art

Many airports handle different types of aircraft ranging from highly sophisticated and complex military aircraft and commercial airliners to ultra-simple single engine airplanes with little in the way of navigation or communication capabilities. Further, the pilot's experience and ability associated with these different aircraft also varies greatly. Edges and center lines of runways and taxiways are typically illuminated with individual incandescent lamps of comparatively high candle power. The type of illumination utilized in many previous systems exhibited a comparatively high installation cost. The power requirements for such prior systems also were excessive, and the systems were expensive to maintain. The construction and maintenance of a standard electrical illuminating system in certain areas is not always practical. Federal Regulations require these areas to be "lit" for night operations. This invention uses lighting sources which employ laser beams to provide illumination of airport runways and taxiways, preferred approach and departure routes, seaplane base landing areas, marine waterways, as well as to assist in search and rescue operations.

The related art is represented by the following patents of interest.

U.S. Pat. No. 3,866,032, issued on Feb. 11, 1975 to Raymond M. Veres, describes an illumination system for providing center and edge stripes for an airport runway, in which six laser generating stations are respectively arranged in with relationship with the ends of the proposed stripes.

U.S. Pat. No. 4,291,294, issued on Sep. 22, 1981 to Wendell D. Chase, describes a landing approach lighting system which utilizes red warning lights to delineate the runway approach with additional blue lights juxtaposed with the red lights such that the red lights are chromatically balanced.

U.S. Pat. No. 4,554,543, issued on Nov. 19, 1985 to Ivan S. Wyatt et al., describes a glide slope indicator system in which light from an incoming aircraft's landing light is shaped by a spherical/cylindrical lens combination into a line image which strikes a linear photodiode array.

U.S. Pat. No. 4,700,912, issued on Oct. 20, 1987 to Marshall J. Corbett, describes a laser system for illuminating a column of air which captures an aircraft thereby enabling a pilot to see the air column and "bucket" during take-off and landing.

U.S. Pat. No. 4,707,696, issued on Nov. 17, 1987 to Harry L. Task et al., describes a portable glide slope indicator including a pair of light sources, one projecting a steady beam and one projecting a blinking beam.

U.S. Pat. No. 4,862,164, issued on Aug. 29, 1989 to Henry C. Croley et al., describes a portable infrared landing site illumination system for fixed wing and rotary wing aircraft having night vision capabilities as provided by the Army's second generation goggles (PVS-5) or the third generation goggles (ANVIS).

U.S. Pat. No. 5,531,402, issued on Jul. 2, 1996 to Robert M. Dahl, describes a wireless flight control system.

U.S. Pat. No. 5,593,114, issued on Jan. 14, 1997 to Louis F. Ruhl, describes an landing system which allows the pilot to view the approach scene with the use of a forward looking radar or equivalent sensor which provides the means of identifying the runways and the airport and land the aircraft using the automatic landing systems on virtually all types of aircraft.

European Patent Number 0 283 441 A2, published on Sep. 21, 1988, describes a lighting system employing light sources and prism elements.

Great Britain Patent Application Number 2,202,980 A, published on Oct. 5, 1988, describes a flight path indicator including a plurality of individual light sources, beam-forming means for directing light from each of the light sources through a respective color filter and lens system to produce a plurality of differently colored diverging light beams and means for directing the beams at different inclinations to define different angular sectors.

International Patent document WO 92/04232, published on Mar. 19, 1992, describes a marker light for airfields that includes a light source and a prism so as to provide two light beams with a desired elevational angle relative to the ground level plane.

U.S. Pat. No. 3,710,098, issued Jan. 9, 1973 to N. H. F. Walden, and U.S. Pat. No. 4,185,891, issued Jan. 29, 1980, disclose a laser producing a beam and a plano-convex cylindrical lens. U.S. Pat. No. 5,584,137, issued Dec. 17, 1996 to J. W. Teetzel, shows a laser gun sight with an attached flashlight module. U.S. Pat. No. 5,909,062, issued Jun. 1, 1999 to M. H. Krietzman, describes a secondary or redundant power supply for a combination laser-flashlight.

None of the above inventions and patents, taken either singularly or in combination, is seen to describe the instant invention as claimed.

SUMMARY OF THE INVENTION

The present invention is a laser lighting system which employs laser beam lighting sources to provide illumination of airport runways and taxiways, preferred approach and departure routes, seaplane base landing areas, marine waterways, as well as to assist in search and rescue operations.

In one aspect, the laser lighting system of the present invention comprises a device for search and rescue operations having a flashlight at one end and a laser light source at the opposite end, as claimed in U.S. Pat. No. 6,007,219, issued to Applicant Dec. 28, 1999.

In another aspect, the laser lighting system of the present invention comprises a device for search and rescue operations having a laser light source built-in to the handheld speaker/microphone of a communications transceiver as claimed in U.S. Pat. No. 6,163,247, issued to Applicant Dec. 19, 2000.

Still other aspects of the laser lighting system of the present invention include an omnidirectional retroreflective marker and the marker in combination with a laser light source, as claimed in application Ser. No. 09/649,506, filed Aug. 28, 2000, now pending issuance, and a laser lighting system and post for providing radiation along a surface as claimed in application Ser. No. 09/545,876, filed Apr. 7, 2000, now pending issuance.

The claims in the present application are directed to yet another aspect of the laser lighting system of the present invention, viz., a handheld laser device, such as a laser flare which may be used as a signaling device for search and rescue situations, and which may also be used as a lighting source for illumination, recognition, and identification of retroreflective markings and materials on airport runways and taxiways, preferred approach and departure routes, seaplane base landing areas, marine waterways, buoys, channel markers, flotation devices, life rafts, and to assist in search and rescue missions.

One inventive laser lighting system includes three laser radiation stations at either end of a runway. The runway additionally includes a plurality of reflectors, however these are not required. The reflectors are fabricated from reflectorizing material. The three laser radiation stations at either end of the runway are respectively positioned in spaced relation and in line with the edges and the centerline of the runway. Each radiation station can be activated manually or by remote control radio signals using standard five click switching devices.

Each radiation station includes a plurality of laser generators, preferably three or more. The placement of these laser generators are well below the glide path of landing aircraft but at sufficient height for each of the laser generators to strike all of the reflectors including the threshold markers and runway end identifiers. The laser generators are powered by conventional power supplies. However, the laser generators may also be powered by a storage battery recharged by a solar panel. The laser generators may be shielded with adjustable shields so as to project light only on desired targets. The shields are adjusted through the rotation of vernier adjusters.

Each laser generator is of conventional construction and typically comprises a mixed gas or diode laser. Each generator produces either a rotating, oscillating, or refractive laser. A refractive laser comprises a fixed laser generator equipped with prism lens, preferably a line generator optics lens, which results in transmission of a vertical beam of light. The line generating optics is preferably a glass plano-convex cylindrical lens of which the cylindrical convex surface is aspherical rather than spherical in shape in order to eliminate spherical aberration in the lens. With a standard spherical or rod lens, the projected laser line results in a Gaussian line, i.e. brighter in the center and dim at the outer ends. When this spherical curve is altered, or aspherized, to the proper parameters, the resultant projected laser line becomes uniformly illuminated from end to end. Each generator produces a beam of coherent visible radiation from about 400 to about 700 nanometers, preferably in the range of 488 to 670 nanometers, having a diameter of the order 1.5 millimeters. The laser beam preferably is green in color for maximum visibility.

A laser lighting post according to the invention for providing radiation along a surface includes one laser for producing a beam of coherent visible or reflective radiation, and a glass plano-convex cylindrical lens which has an aspherical convex cylindrical surface for generating a laser line which is uniformly illuminated from end to end. The laser lighting post also includes a mounting column which has an access door for providing access to a tilt switch assembly and an AC/DC power adapter unit. The mounting column is attached to a base plate by a frangible coupling.

A laser lighting unit according to the invention for providing radiation along a surface includes at least one laser for producing a beam of coherent visible or reflective radiation, and a glass plano-convex cylindrical lens which has an aspherical convex cylindrical surface for generating a laser line which is uniformly illuminated from end to end. The laser lighting unit may also include a case containing a flashlight light bulb, at least one battery, and laser switch means for selectively energizing the laser via the at least one battery. The laser lighting unit also includes a light bulb switch means for selectively energizing the light bulb via the at least one battery. The laser lighting unit may also include an enlarged end to form a head having a front opening which is spanned by a parent lens. The laser lighting unit may also include a parabolic reflector.

A handheld laser device according to the present invention has a housing enclosing a battery power supply and a laser for producing a beam of coherent visible, invisible or reflective radiation, and a glass plano-convex cylindrical lens which has an aspherical convex cylindrical surface for generating a laser line which is uniformly illuminated from end to end. Various switch means may be used to activate the device, such as a spring biased plunger, rotary switch, etc. The device includes waterproof seals so that the device may be used in marine applications. Optionally, the handheld device may include a cluster of high intensity light emitting diodes at the end opposite the laser beam, together with a circuit which flashes SOS when activated.

Accordingly, it is a principal object of the invention to provide a laser lighting system which includes a handheld laser device which may be used as a signaling device for search and rescue situations.

It is another object of the invention to provide a laser lighting system handheld laser device for providing radiation along a surface that includes one laser for producing a beam of coherent visible, invisible or reflective radiation, and a glass plano-convex cylindrical lens which has an aspherical convex cylindrical surface for generating a laser line which is uniformly illuminated from end to end.

It is a further object to provide a handheld laser device which may be used as a lighting source for illumination, recognition, and identification of retroreflective markings and materials on airport runways and taxiways, preferred approach and departure routes, seaplane base landing areas, marine waterways, buoys, channel markers, flotation devices, life rafts, and to assist in search and rescue missions.

Still another object of the invention is to provide a handheld laser device which includes a laser emitting a laser beam at one end of the device, and optionally includes a cluster of high intensity light emitting diodes at the end opposite the laser beam, together with a circuit which flashes SOS when activated.

Yet another object of the invention is to provide a handheld laser device for search and rescue operations which includes waterproof seals for marine applications.

It is an object of the invention to provide improved elements and arrangements thereof in a laser lighting system for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 19 is a front view of another type of VHF transceiver equipped with a laser lighting unit according to the invention.

Similar reference characters denote corresponding features consistently throughout the attached drawings.

DETAILED DESCRIPTION OF THE PREFERRED EMBODIMENTS

Figure 1:
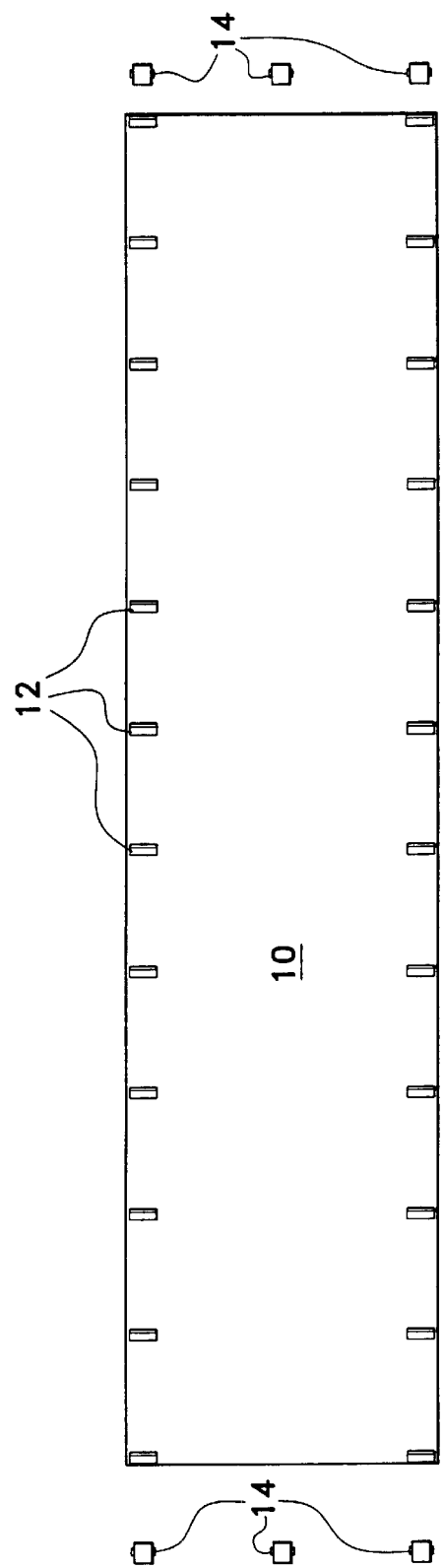
FIG. 1 is a top view of a runway equipped with a laser lighting system according to the present invention.
Figure 2:
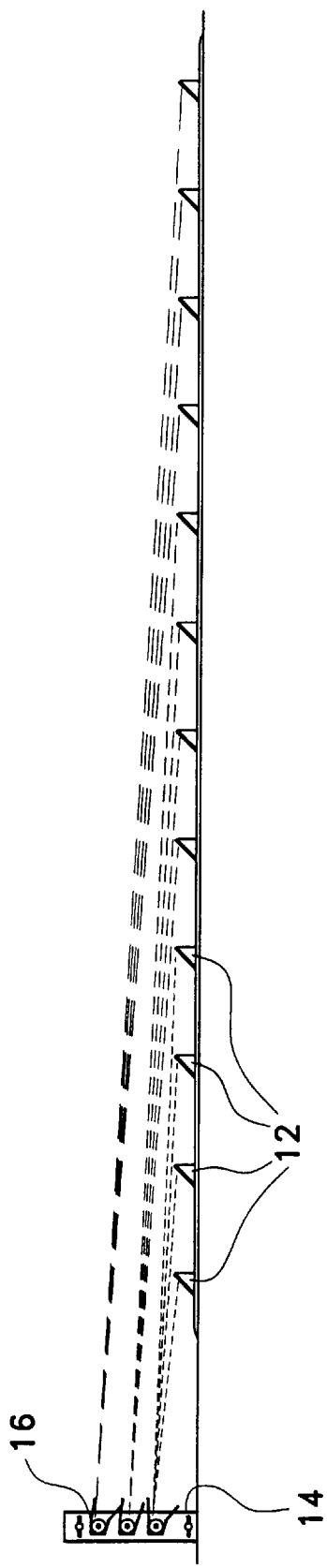
FIG. 2 is a side view of the runway shown in FIG. 1.
Figure 3:
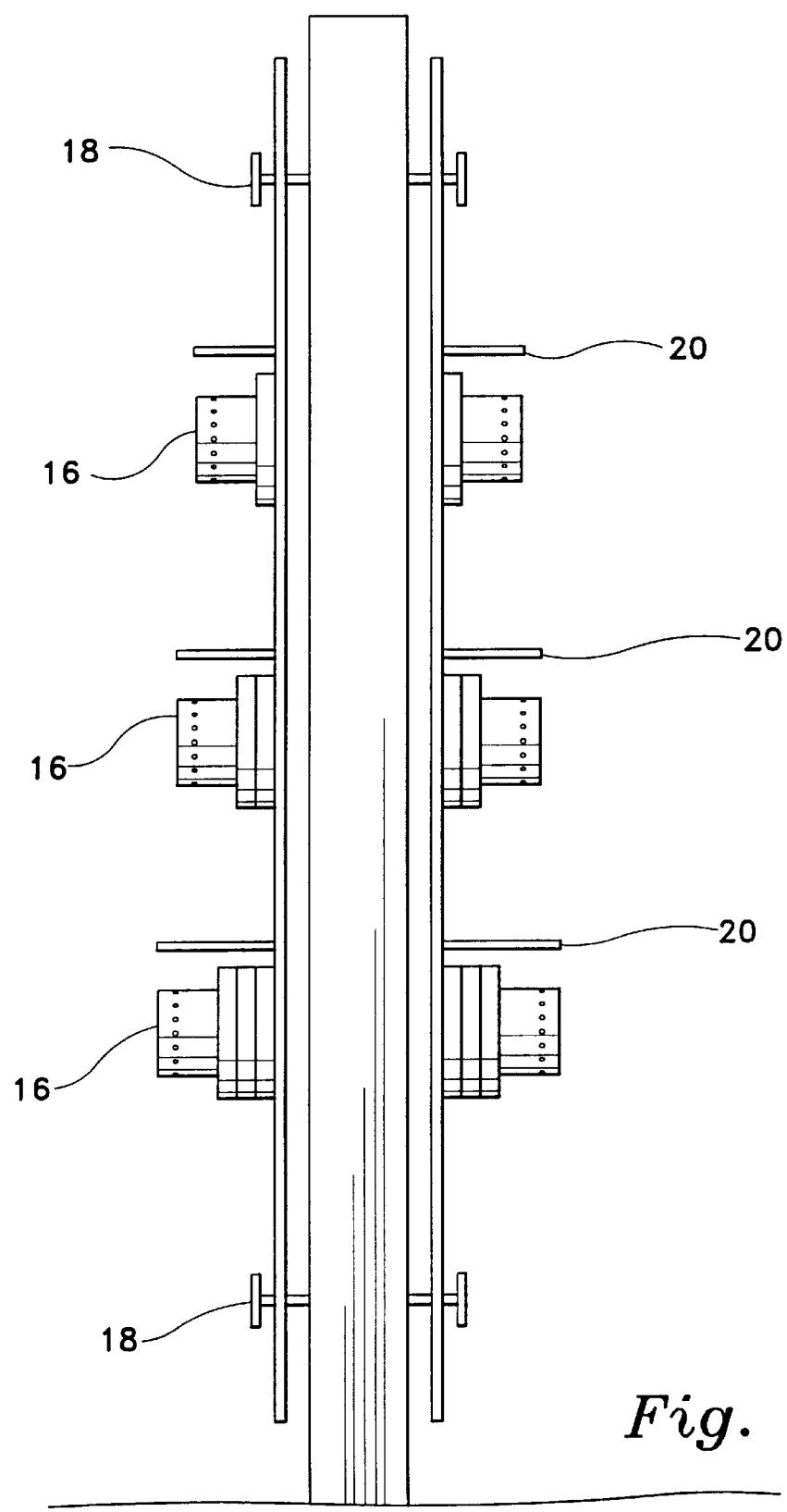
FIG. 3 is a front view of a laser lighting post according to the invention.

Referring to FIG. 1 of the drawings, there is shown a first runway 10 equipped with a laser lighting system for indicating to incoming aircraft a desired, preferred or required path of travel. The laser lighting system includes three laser radiation stations 14 at either end of the runway 10. The runway 10 additionally includes a plurality of reflectors 12, however these are not required. The reflectors 12 are fabricated from reflectorizing material. The three laser radiation stations 14 at either end of the runway 10 are respectively positioned in spaced relation and in line with the edges and the centerline of the runway 10.

Figure 4:
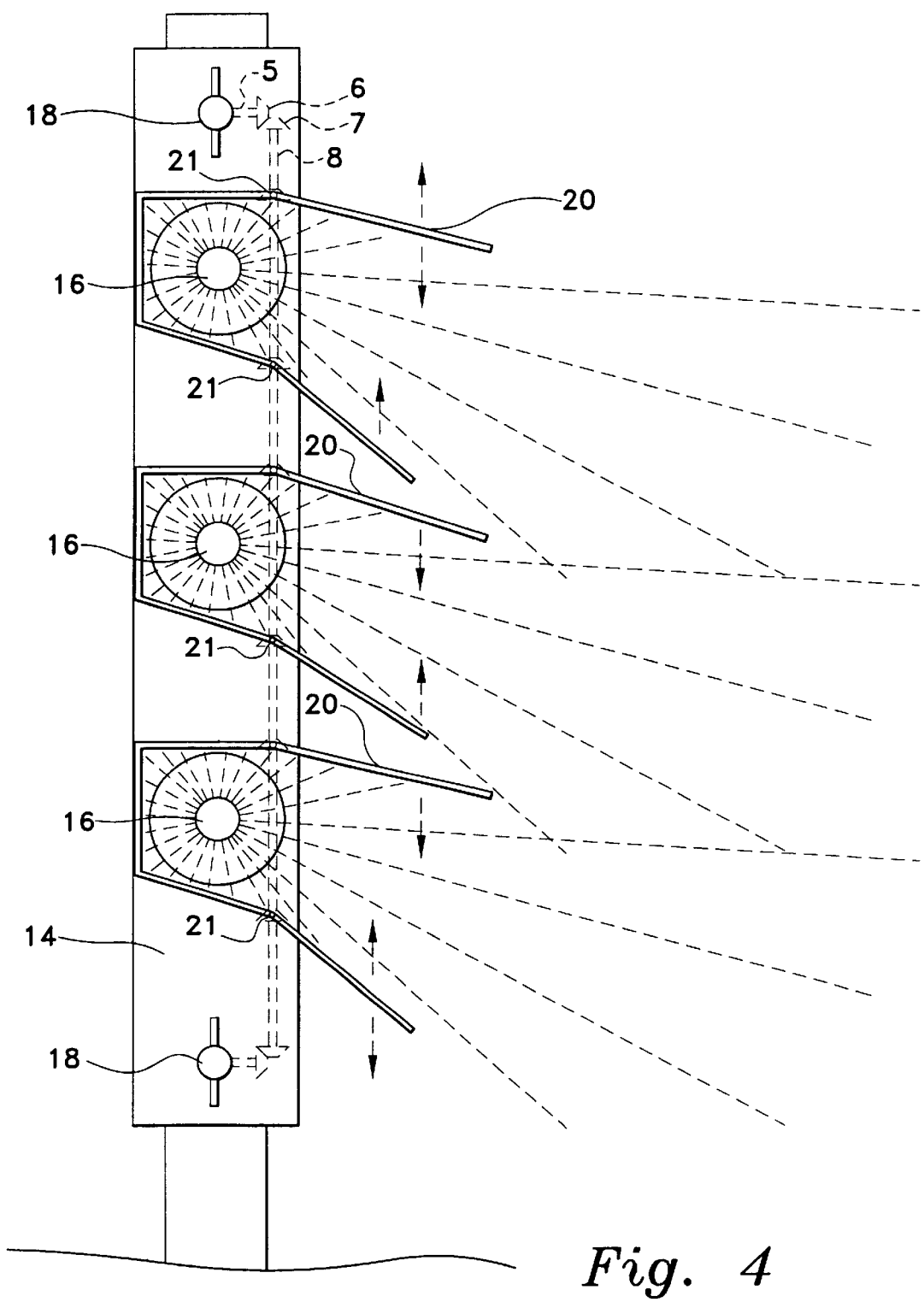
FIG. 4 is a side view of the laser lighting post shown in FIG. 3.
Figure 4B:
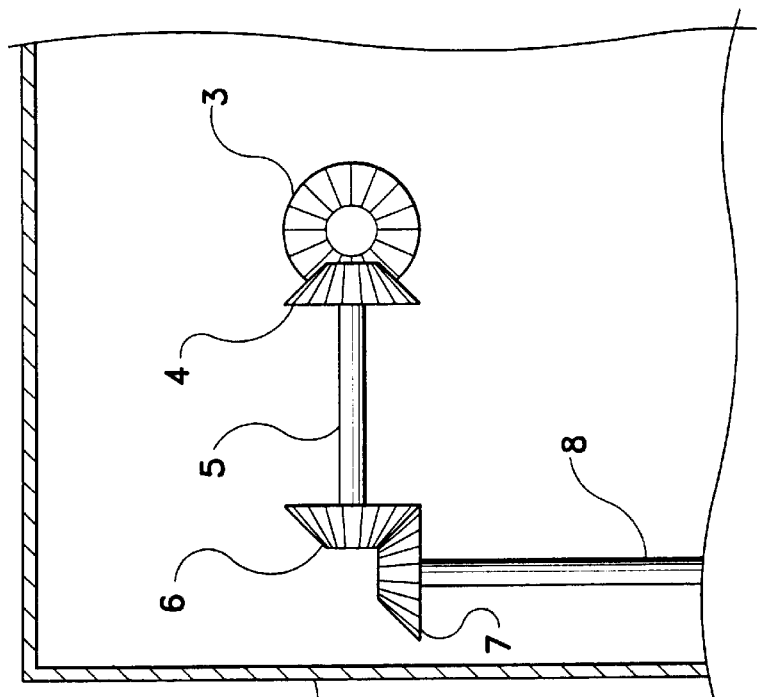
FIG. 4B is a cutaway rear view of the vernier adjustment means shown in FIG. 4A.
Figure 4A:
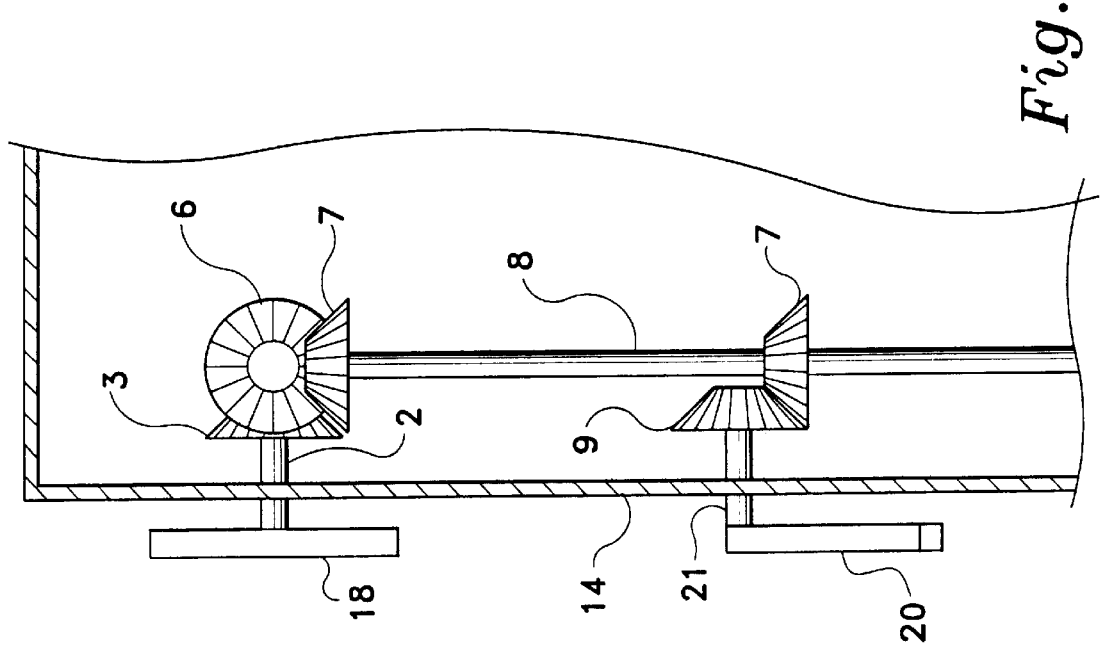
FIG. 4A is a cutaway side view of one type of vernier adjustment means according to the invention.

As shown in FIGS. 2–4B, each radiation station 14 includes a plurality of laser generators 16, preferably three or more. The placement of these laser generators 16 are well below the glide path of landing aircraft but at sufficient height for each of the laser generators 16 to strike all of the reflectors 12 including the threshold markers and runway end identifiers. The laser generators 16 are powered by conventional power supplies. The laser generators 16 are shielded with adjustable shields 20 so as to project light only on desired targets. The shields are adjusted through the rotation of vernier adjusters 18. As shown in FIGS. 4A and 4B, rotation of the vernier adjusters 18 effect the pivoting of adjustable shields 20 up or down about pivot points 21. One technique for pivoting the adjustable shields 20 up or down about pivot points 21 includes the use of bevel gears 3, 4, 6, 7, and 9 attached to shafts 2, 5, and 8. However, any means known in the art may be employed to adjust the shields 20 about pivot points 21. The arrival and departure corridors if applicable are indicated by visible lasers projected from similar laser generators. Additional lasers may target reflective devices placed on obstacles such as terrain or obstructions in the vicinity of such airports. The laser generators can be activated manually or by remote control radio signals using standard five click switching devices.

Each laser generator 16 is of conventional construction and typically comprises a mixed gas or diode laser. Each generator 16 produces either a rotating, oscillating, or refractive laser. A refractive laser comprises a fixed laser generator equipped with prism lens, preferably a line generator lens, which results in transmission of a vertical beam of light. Each generator 16 produces a beam of coherent visible radiation from about 400 to about 700 nanometers, preferably in the range of 488 to 670 nanometers, having a diameter of the order 1.5 millimeters. The laser beam preferably is green in color for maximum visibility.

Figure 5:
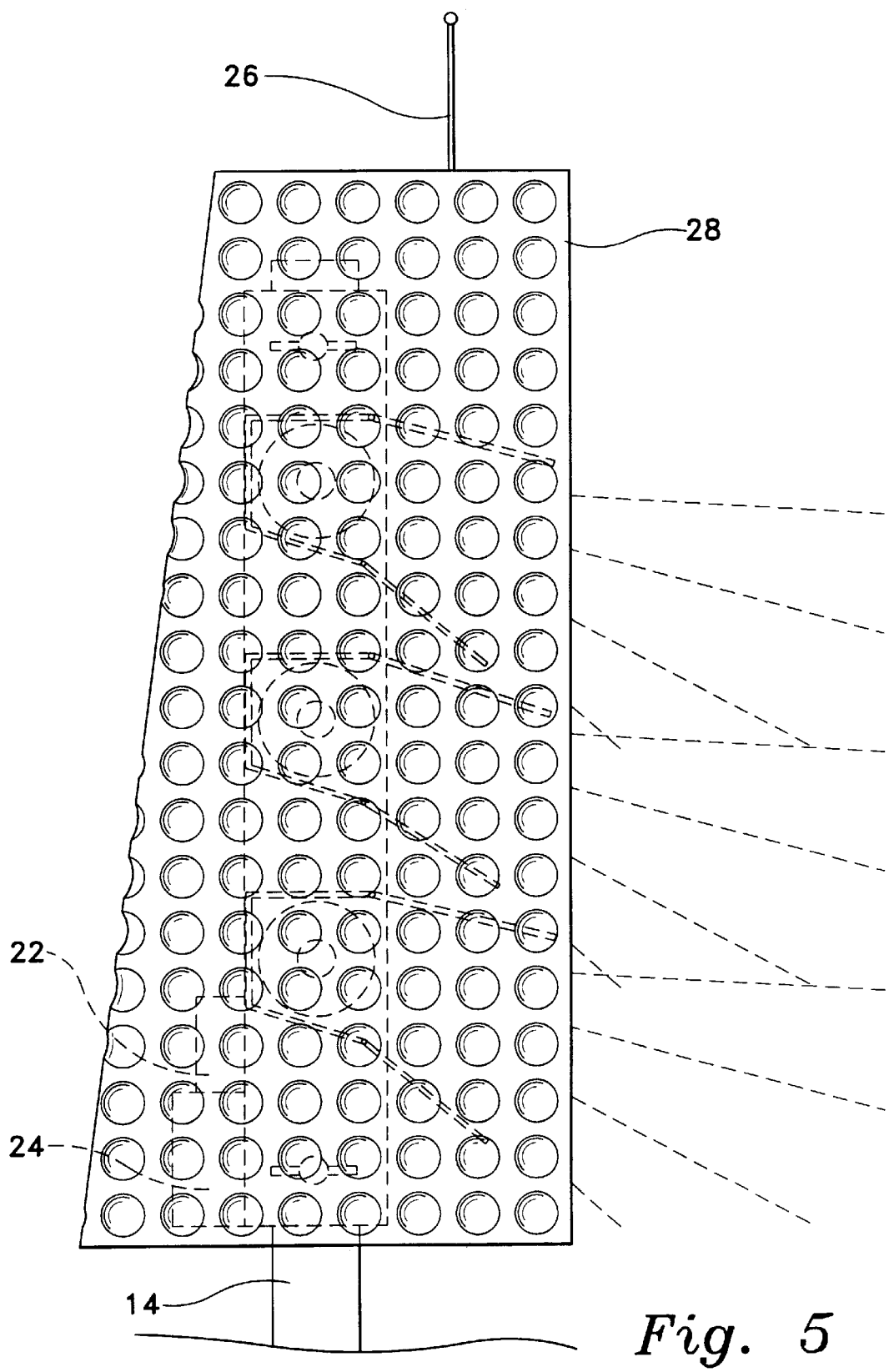
FIG. 5 is a side view of another laser lighting post according to the invention.

FIG. 5 illustrates another laser radiation station according to the invention. The laser radiation station 14 includes a post with a plurality of shielded lasers mounted thereon similar to the laser radiation stations shown in FIGS. 2–4. However, in this case the laser generators are powered by a storage battery 24 recharged by a solar panel 28 which additionally acts as a protective cover The laser radiation station also includes an antenna 26 mounted at the top of the station which receives incoming signals that activate the laser radiation station through the use of a radio activator 22.

Figure 6:
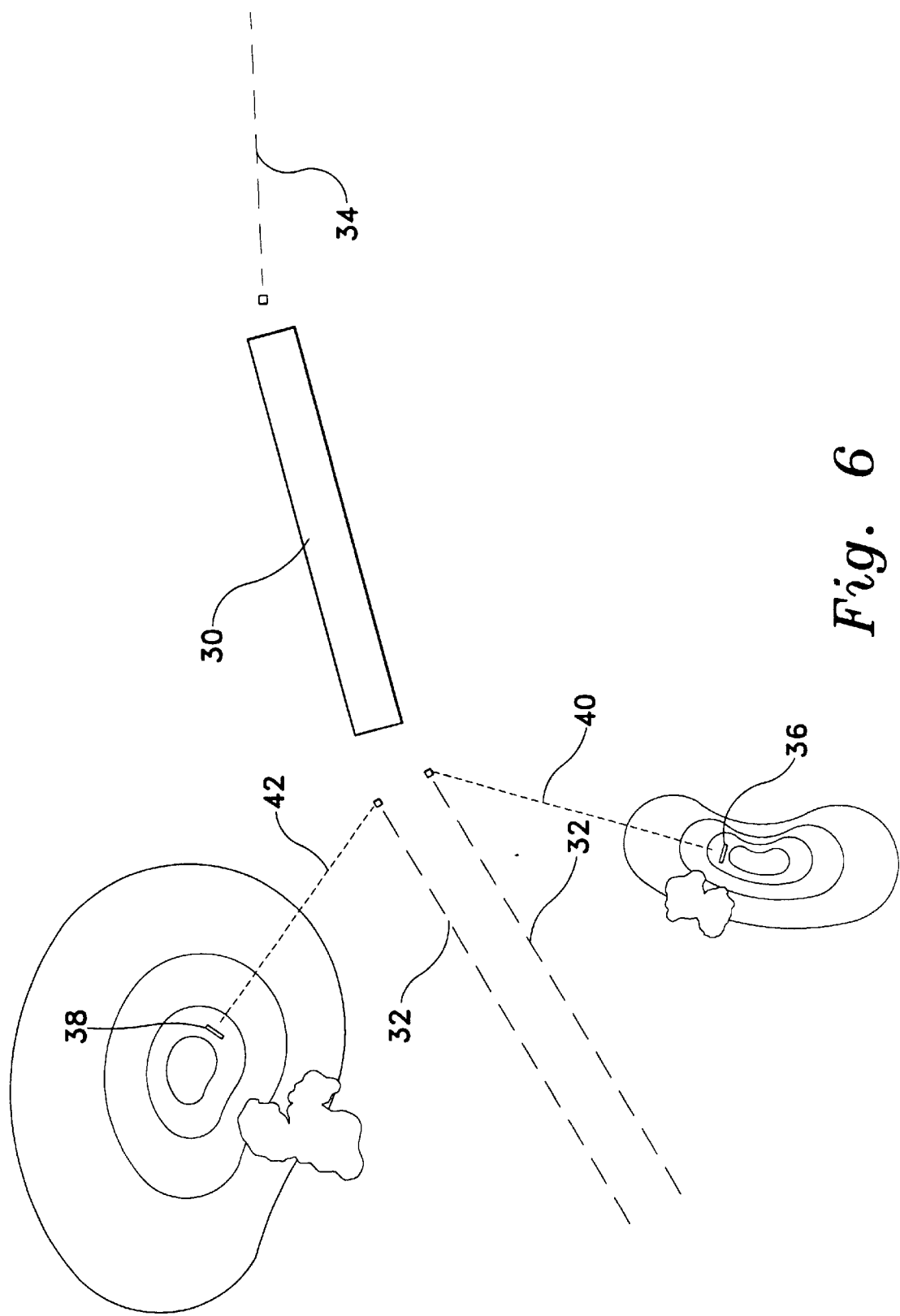
FIG. 6 is a top view of a second runway equipped with a laser lighting system according to the invention.

FIG. 6 illustrates a second runway 30 equipped with visible and reflective laser radiation stations. Visible approach laser beams 32 are transmitted to give incoming pilots an indication of the preferable approach path to the runway 30. A visible departure laser beam 34 is also transmitted to give outgoing pilots an indication of the preferable departure path from runway 30. In addition to the visible laser beams 32 and 34, FIG. 6 additionally includes reflective laser beams 40 and 42 which respectively reflect off of reflectors 36 and 38 which are mounted on hilly obstacles which should be avoided.

Figure 7:
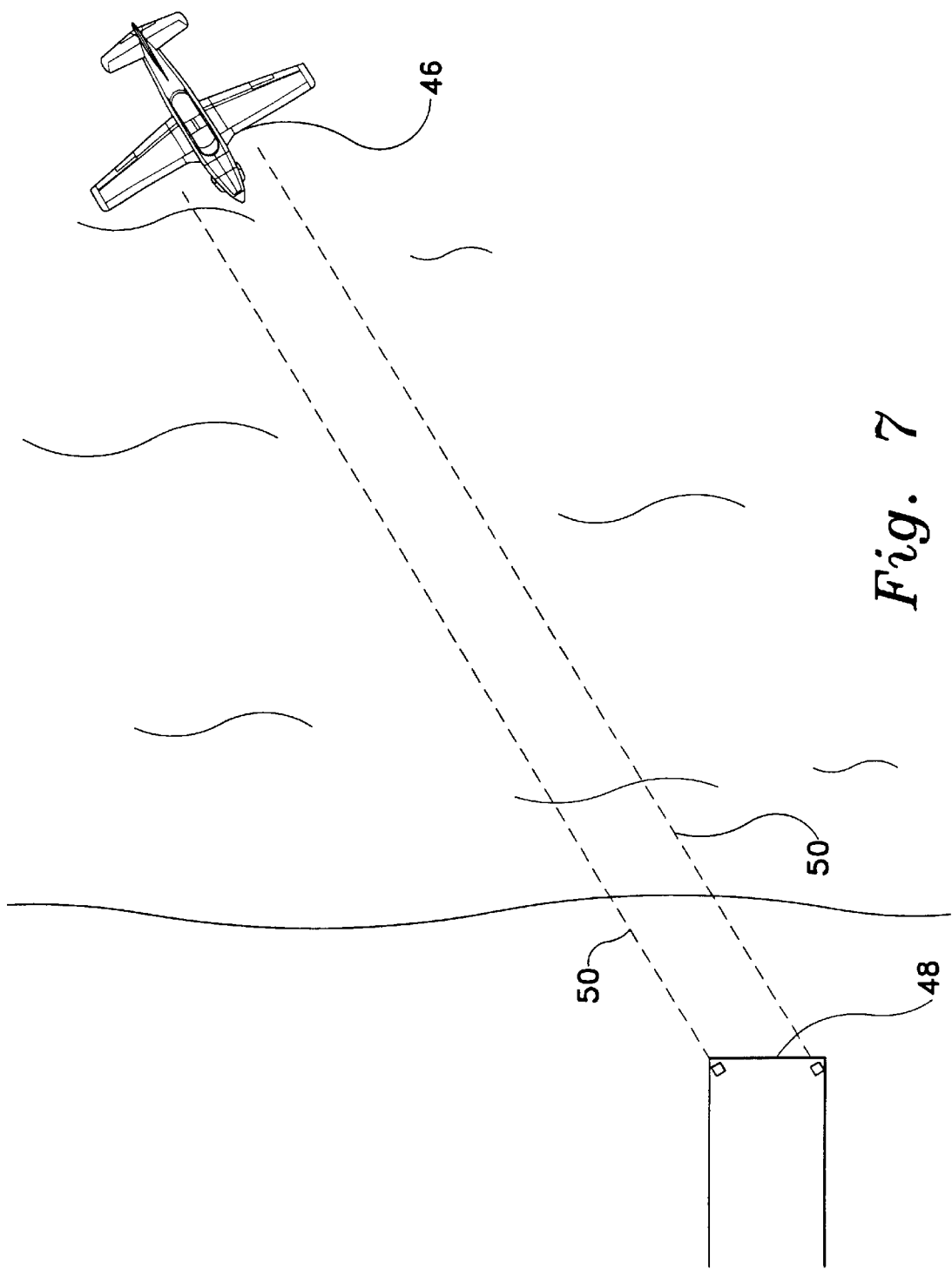
FIG. 7 is a top view of a marine waterway equipped with a laser lighting system according the invention.

An application for a seaplane or skiplane base on a first marine waterway is shown in FIG. 7. The laser beams may terminate on the opposite shore or end in infinity. An aircraft 46 is flying toward a dock 48 which includes laser generators mounted thereon that transmit visible laser beams 50 to indicate a preferred approach path to the dock 48. The visible laser beams 50 are transmitted a suitable location, such as about one foot above the water or ice of the waterway, on a horizontal plane.

Figure 8:
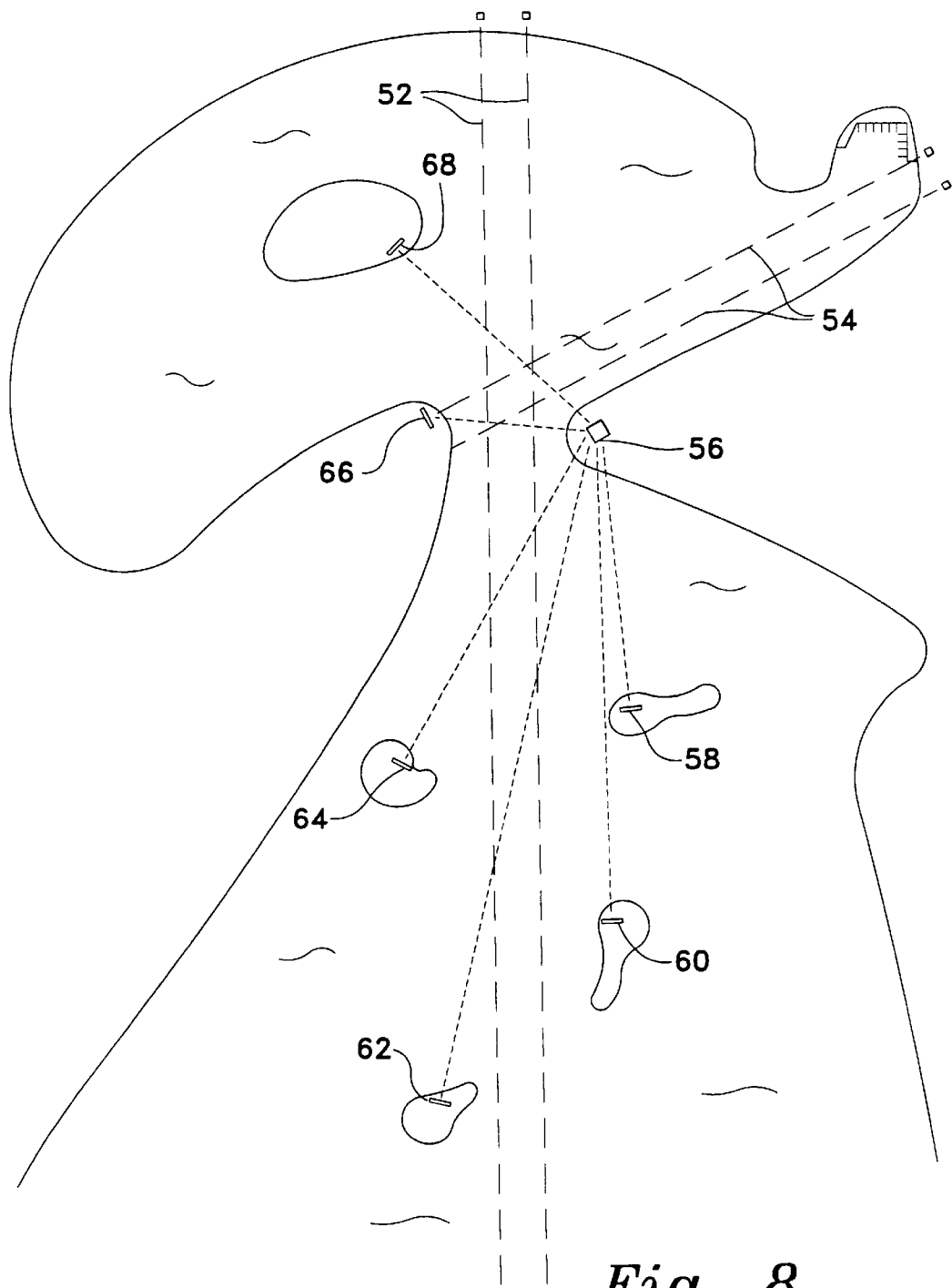
FIG. 8 is a top view of another marine waterway equipped with a laser lighting system according the invention.

A second marine waterway is illustrated in FIG. 8. Two sets of visible laser beams 52 and 54 are transmitted a small distance over the waterway to indicate preferable docking approach paths to landing docks. Visible laser beams are placed on floating structures to indicate safe passage to and from harbors, moorages, and channels. In addition, the marine waterway includes the use of a reflective laser radiation station 56. The reflective laser radiation station transmits reflective laser beams that target reflective devices 58, 60, 62, 64, 66, and 68 that are placed on or around permanent or temporary obstacles, hazards and markers.

Figure 9:
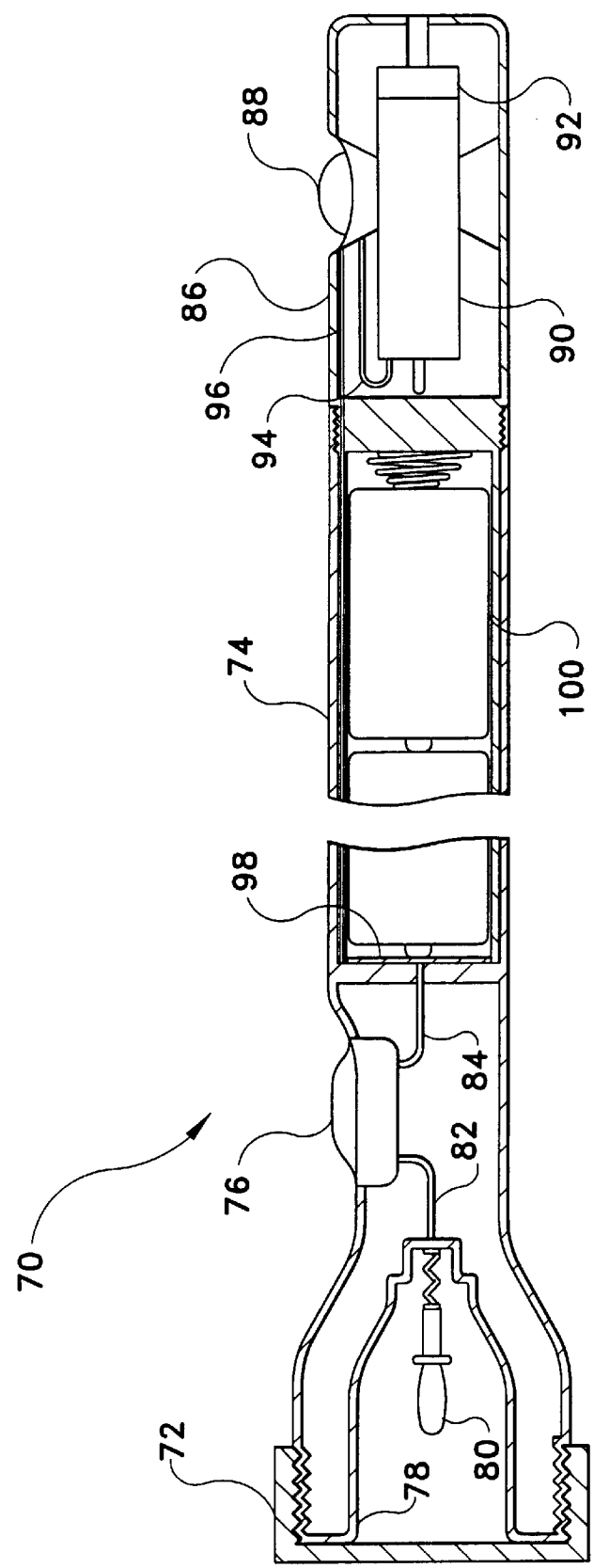
FIG. 9 is a side view of a handheld laser lighting unit according to the invention that includes a flashlight.

FIG. 9 shows a laser lighting unit 70 in the form of a handheld flashlight for use in search and rescue operations. When people are stranded in the water due to an accident or other misfortune, oftentimes search and rescue personnel are sent into the area to locate the missing individuals. The laser lighting unit 70 enhances the ability of search and rescue personnel to locate missing individuals. The laser lighting unit 70 includes a case 74 containing a flashlight light bulb 80 and switch means 76 for selectively energizing the light bulb 80 from batteries 100 to illuminate the light bulb 80 via wiring 82 and 84. The case 74 is cylindrical in shape and receives the front end of a case 86 which is screwed into the end of case 74. The front end of case 86 contains a battery compartment for receiving a plurality of batteries 100, typically D size batteries, in series relation to form a power source. The front portion of the case 74 is enlarged to form a head having a front opening or aperture spanned by a parent lens 72. Within the head behind the light bulb 80 is a generally parabolic reflector 78. The light bulb 80 is situated approximately at the focus of the reflector 78 and is removably mounted within a cup holder at the rear of the reflector 78. Within the holder behind the light bulb 80 is a compression spring. This spring seats at its front end against a base end contact of the light bulb 80 and at its rear end against a contact at the rear end of the holder.

The rear end of case 86 contains a laser 90 including a lens 92 for directing the generated laser light. The lens 92 is a line generating optic comprising a glass plano-convex cylindrical lens having an aspherical cylindrical convex surface which is critical for generating a laser line which is uniformly illuminated from end to end. Conventional cylindrical lens employ a spherical cylindrical convex surface which, when employed with lasers, results in a Gaussian line, i.e. brighter in the center and dim at the outer ends. When this spherical cylindrical convex surface is altered, or aspherized, to the proper parameters, the resultant projected laser line becomes uniformly illuminated from end to end. The laser 90 is powered by means of switch means 88 which selectively energizes the laser 90 via wiring 94 which provides power from switch means 88 delivered through wiring 96 which interconnects a metal lid 98 of case 86 within which the batteries 100 are placed. The projected laser line is emitted through the rear end of case 86 through a small opening.

Figure 10:
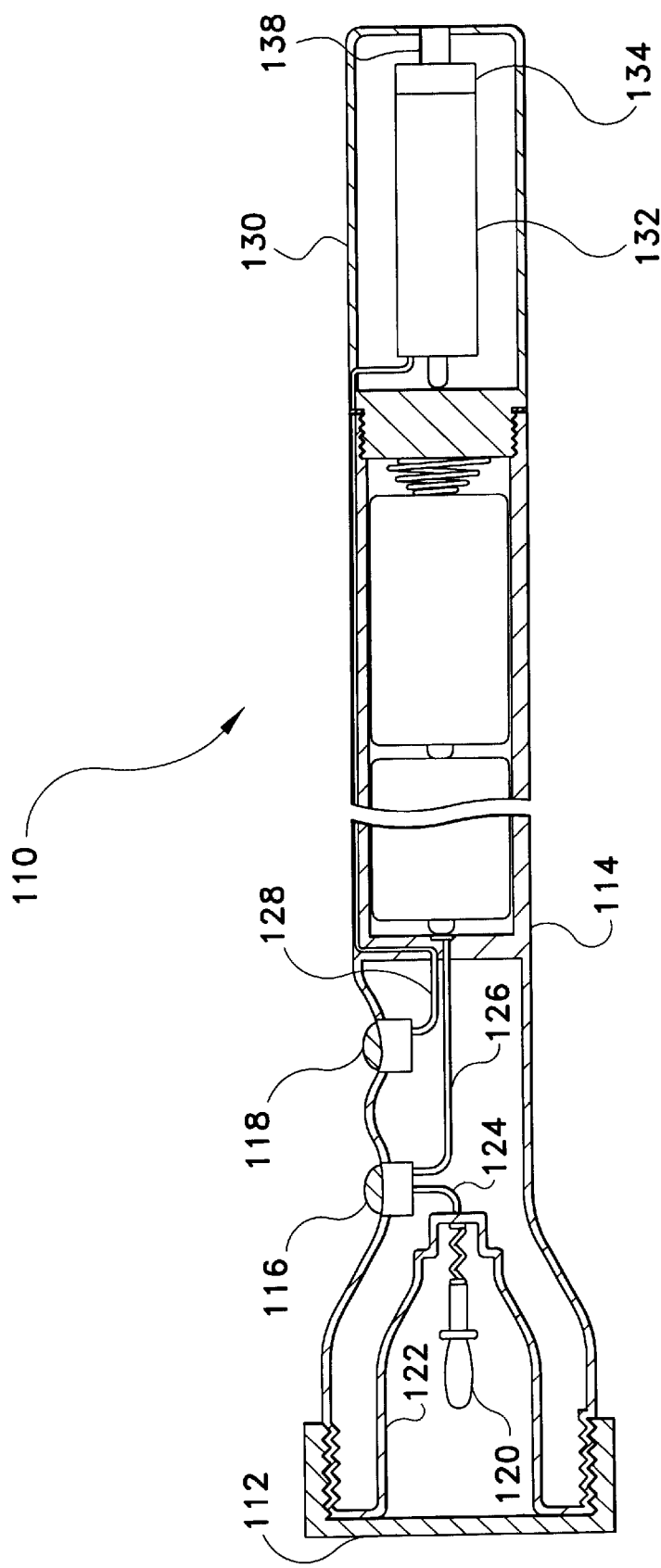
FIG. 10 is a side view of a handheld laser lighting unit according to the invention that includes a flashlight.

FIG. 10 shows a laser lighting unit 110 which is similar to the laser lighting unit 70 shown in FIG. 9. The laser lighting unit 110 includes a case 114 containing a flashlight light bulb 120 and switch means 116 for selectively energizing the light bulb 120 from batteries to illuminate the light bulb 120 via wiring 124 and 126. The case 114 is cylindrical in shape and receives the front end of a case 130 which is screwed into the end of case 114. However, case 114 also includes switch means 118 for a laser 132 at the forward end of case 114. Furthermore, case 114 contains a battery compartment for receiving a plurality of batteries, typically D size batteries, in series relation to form a power source.

The front portion of case 114 is enlarged to form a head having a front opening or aperture spanned by a parent lens 112. Within the head behind the light bulb 120 is a generally parabolic reflector 122. The light bulb 120 is situated approximately at the focus of the reflector 122 and is removably mounted within a cup holder at the rear of the reflector 122. Within the holder behind the light bulb 120 is a compression spring. This spring seats at its front end against a base end contact of the light bulb 120 and at its rear end against a contact at the rear end of the holder.

Case 130 contains a laser 132 including a lens 134 for directing the generated laser light. The lens 134 is a line generating optic comprising a glass plano-convex cylindrical lens having an aspherical cylindrical convex surface which is critical for generating a laser line which is uniformly illuminated from end to end. The laser 132 is powered by means of switch means 118 which selectively energizes the laser 132 via wiring 128 which provides power from switch means 118 delivered by the batteries. The projected laser line is emitted through the rear end of case 130 through a small opening 138.

Figure 11:
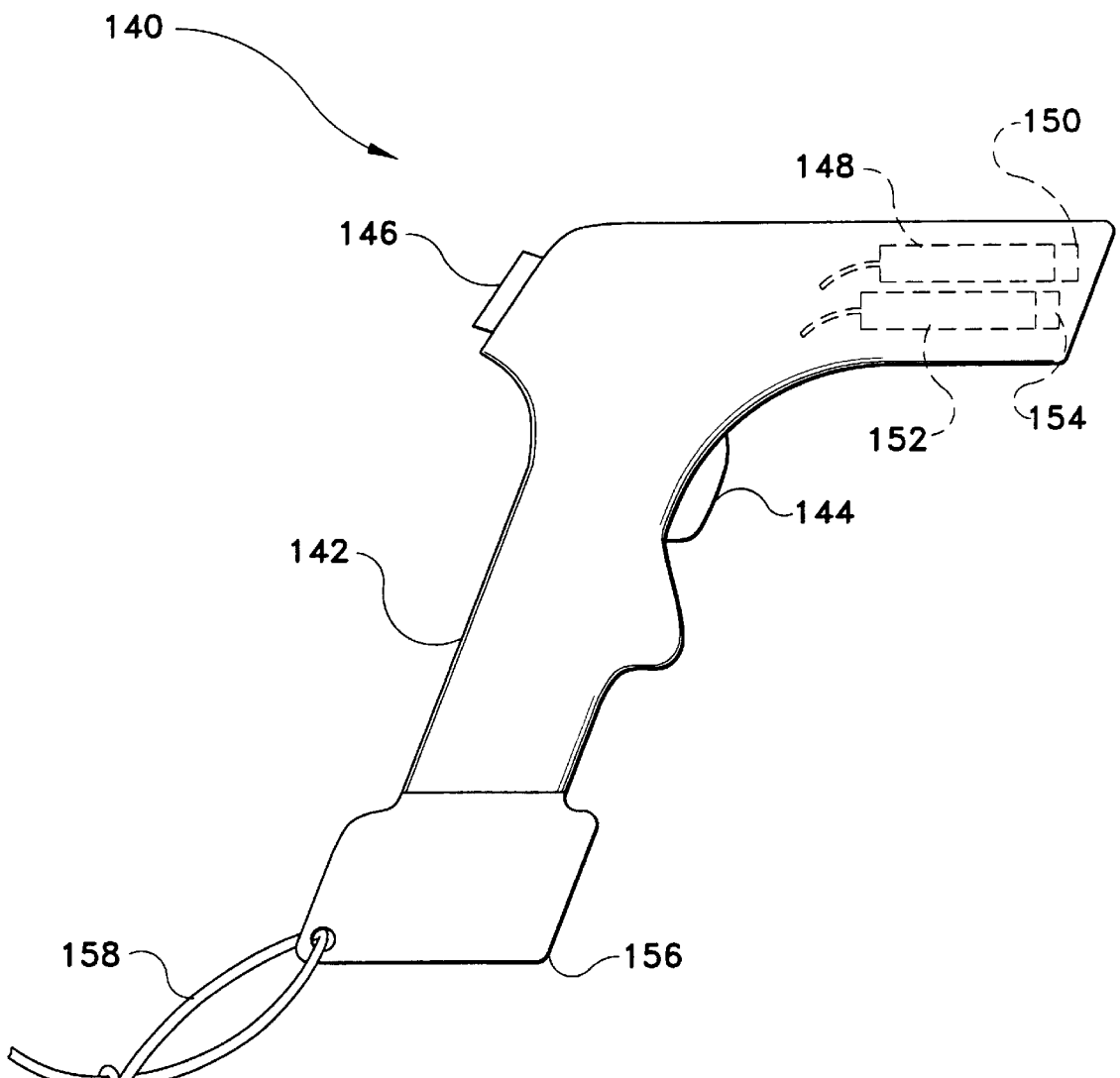
FIG. 11 is a side view of a handheld laser lighting unit according to the invention that includes two lasers in a case powered by a removable rechargeable battery pack.

FIG. 11 shows a handheld laser lighting unit 140 for use in search and rescue operations. The laser lighting unit 140 includes a case 142 containing a green laser 148 and a red laser 152 that each include a line generating optic lens 150 and 154 for directing the generated laser light. The lenses 150 and 154 each comprise a glass plano-convex cylindrical lens having an aspherical cylindrical convex surface which is critical for generating a laser line which is uniformly illuminated from end to end. The laser lighting unit 140 also includes an interchangeable rechargeable battery pack 156. The lasers 148 and 152 are selectively chosen by switch means 146 and are powered by switch means 144 which selectively energizes the lasers 148 and 152 via wiring (not shown) which provides power from switch means 144 delivered from the battery pack 156. The projected laser line is emitted through the front end of case 142. To accommodate shipboard use, the battery pack 156 may include a safety lanyard 158 to facilitate securing the laser lighting unit to a ship.

Figure 12:
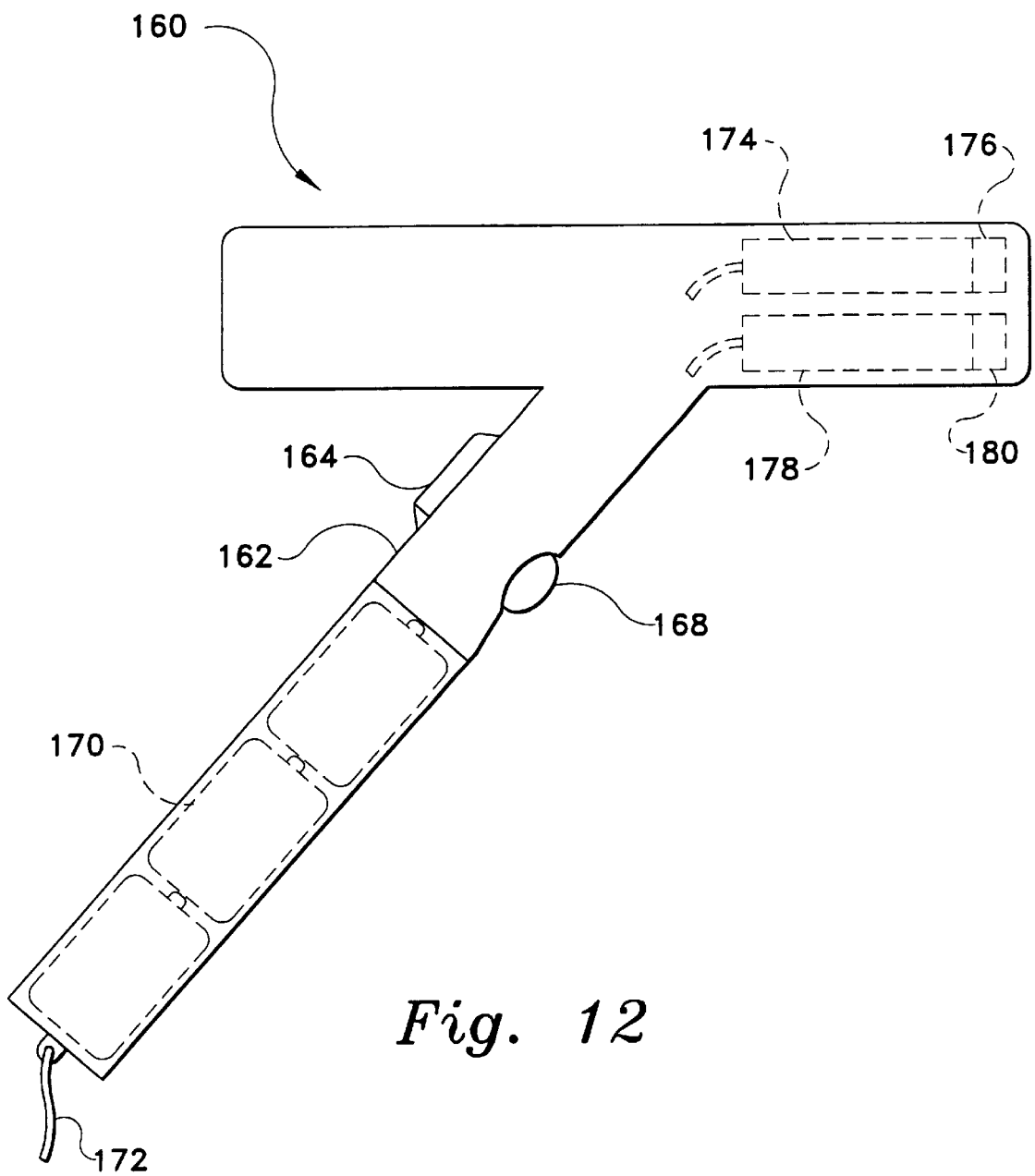
FIG. 12 is a side view of a handheld laser lighting unit according to the invention that includes two lasers in a case with three batteries.

FIG. 12 shows a handheld laser lighting unit 160 for use in search and rescue operations. The laser lighting unit 160 includes a case 162 containing a green laser 174 and a red laser 178 that each include a line generating optic lens 176 and 180 for directing the generated laser light. The lenses 176 and 180 each comprise a glass plano-convex cylindrical lens having an aspherical cylindrical convex surface which is critical for generating a laser line which is uniformly illuminated from end to end. The case 162 also receives a plurality of batteries 170 in series relation to form a power source. The lasers 174 and 178 are selectively chosen by switch means 164 and are powered by switch means 168 which selectively energizes the lasers 174 and 178 via wiring (not shown) which provides power from switch means 168 delivered from the batteries 170. The projected laser line is emitted through the front end of case 162. To accommodate shipboard use, the case 162 may include a cording means 172 to facilitate securing the laser lighting unit to a ship.

Figure 13:
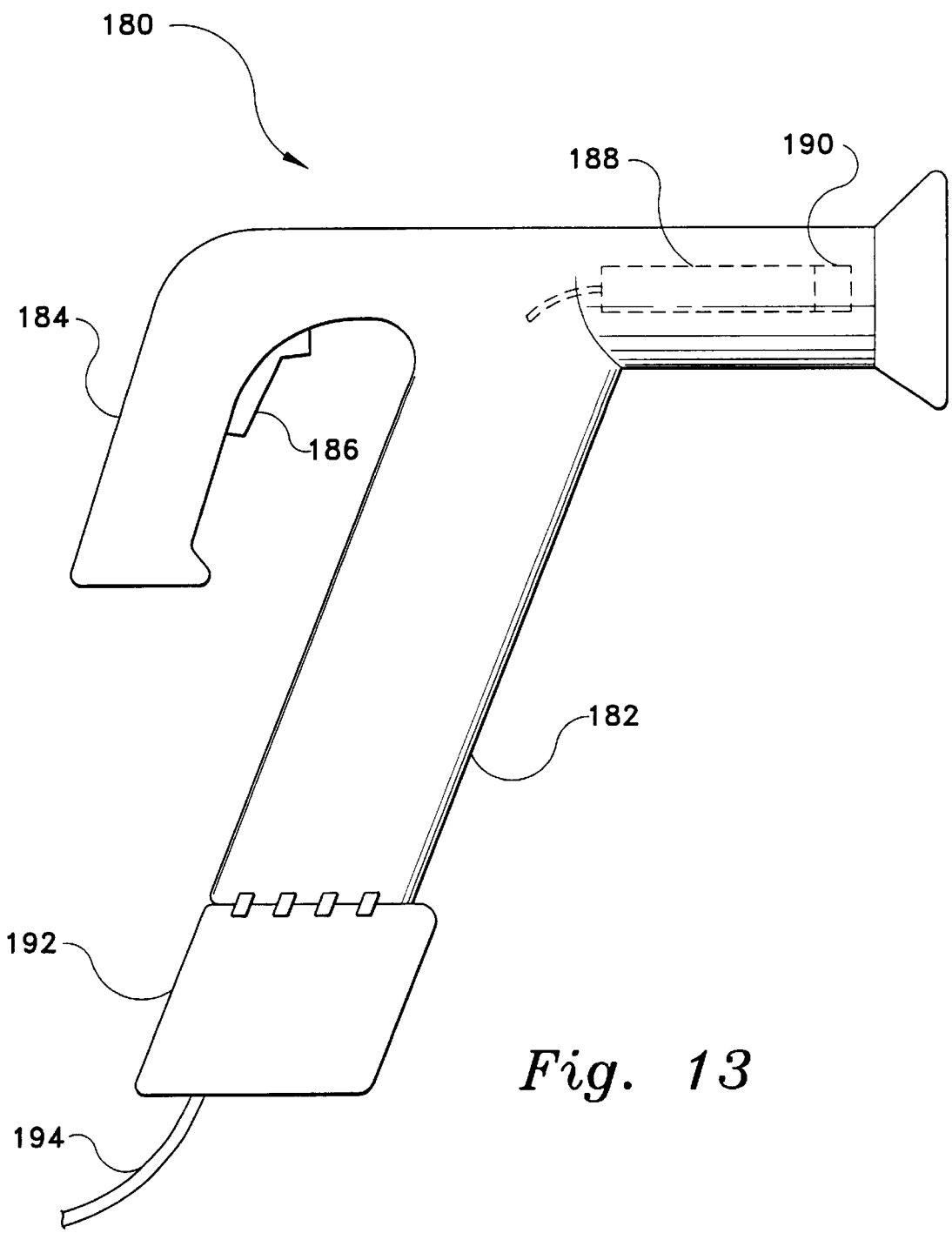
FIG. 13 is a side view of a miniaturized handheld laser lighting unit according to the invention that includes one laser in a case powered by either a removable rechargeable battery pack or shipboard power.

FIG. 13 shows a handheld laser lighting unit 180 for use in search and rescue operations. The laser lighting unit 180 includes a case 182 having a pistol grip handle 184 containing one laser 188 which includes a line generating optic lens 190 for directing the generated laser light. The lens 190 comprise a glass plano-convex cylindrical lens having an aspherical cylindrical convex surface which is critical for generating a laser line which is uniformly illuminated from end to end. The case 182 also includes an interchangeable rechargeable battery pack 192 to form a power source or, alternatively, the pack 192 may provide shipboard power via wiring means 194. The laser 188 is powered by switch means 186 which selectively energizes the laser 188 via wiring (not shown) which provides power from switch means 186 delivered from the power pack 192. The projected laser line is emitted through the front end of case 182.

Figure 14:
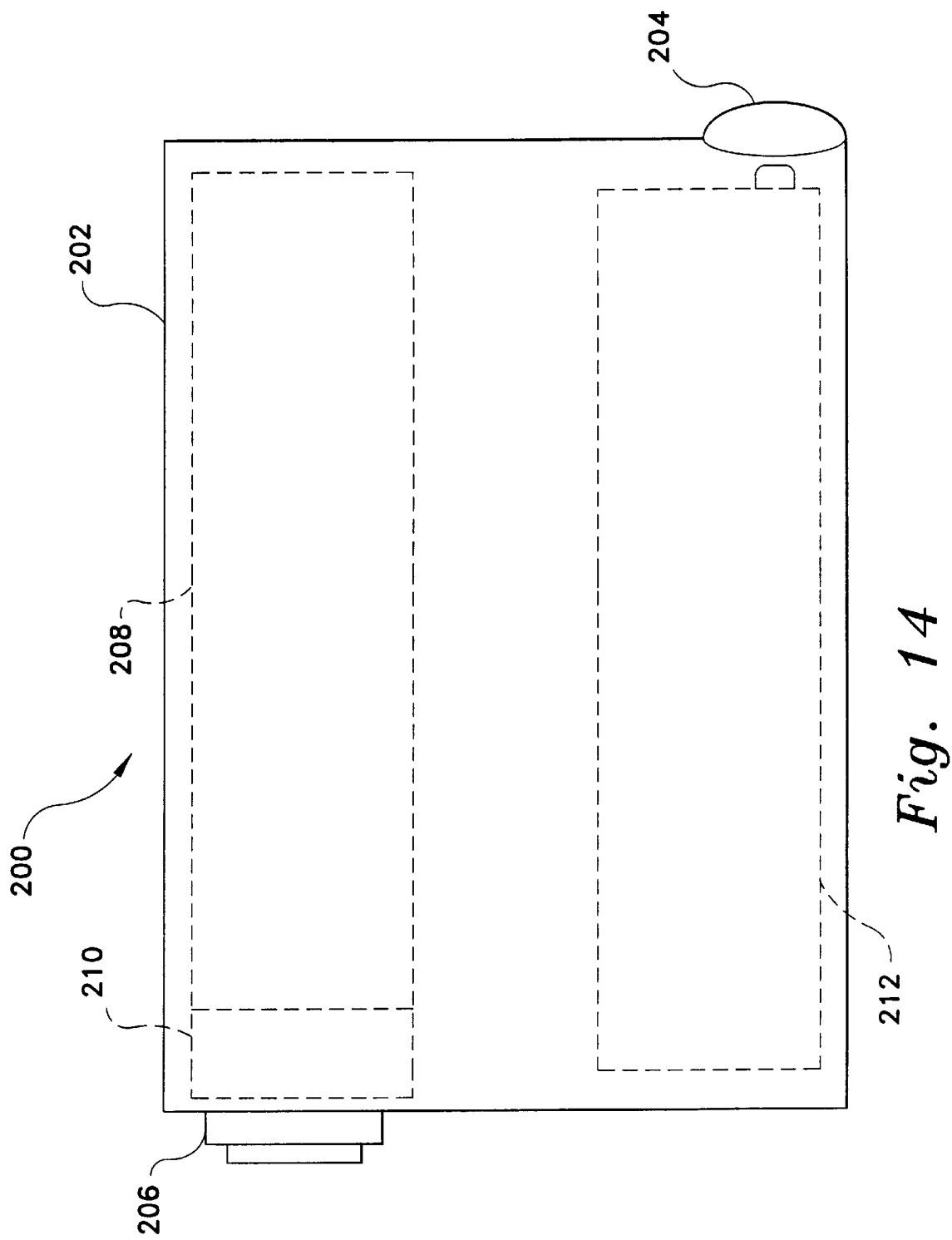
FIG. 14 is a side view of a handheld laser lighting unit according to the invention that includes one laser in a case powered by a battery.

FIG. 14 shows a miniaturized handheld laser lighting unit 200 for use in search and rescue operations. The laser lighting unit 200 includes a case 202 containing one laser 208 which includes a line generating optic lens 210 for directing the generated laser light. The lens 210 comprises a glass plano-convex cylindrical lens having an aspherical cylindrical convex surface which is critical for generating a laser line which is uniformly illuminated from end to end. The case 202 also contains a battery 212 which forms a power source. The laser 208 is powered by switch means 204 which selectively energizes the laser 208 via wiring (not shown) which provides power from switch means 204 delivered from the battery 212. The projected laser line is emitted through the front end 206 of case 202.

Figure 15:
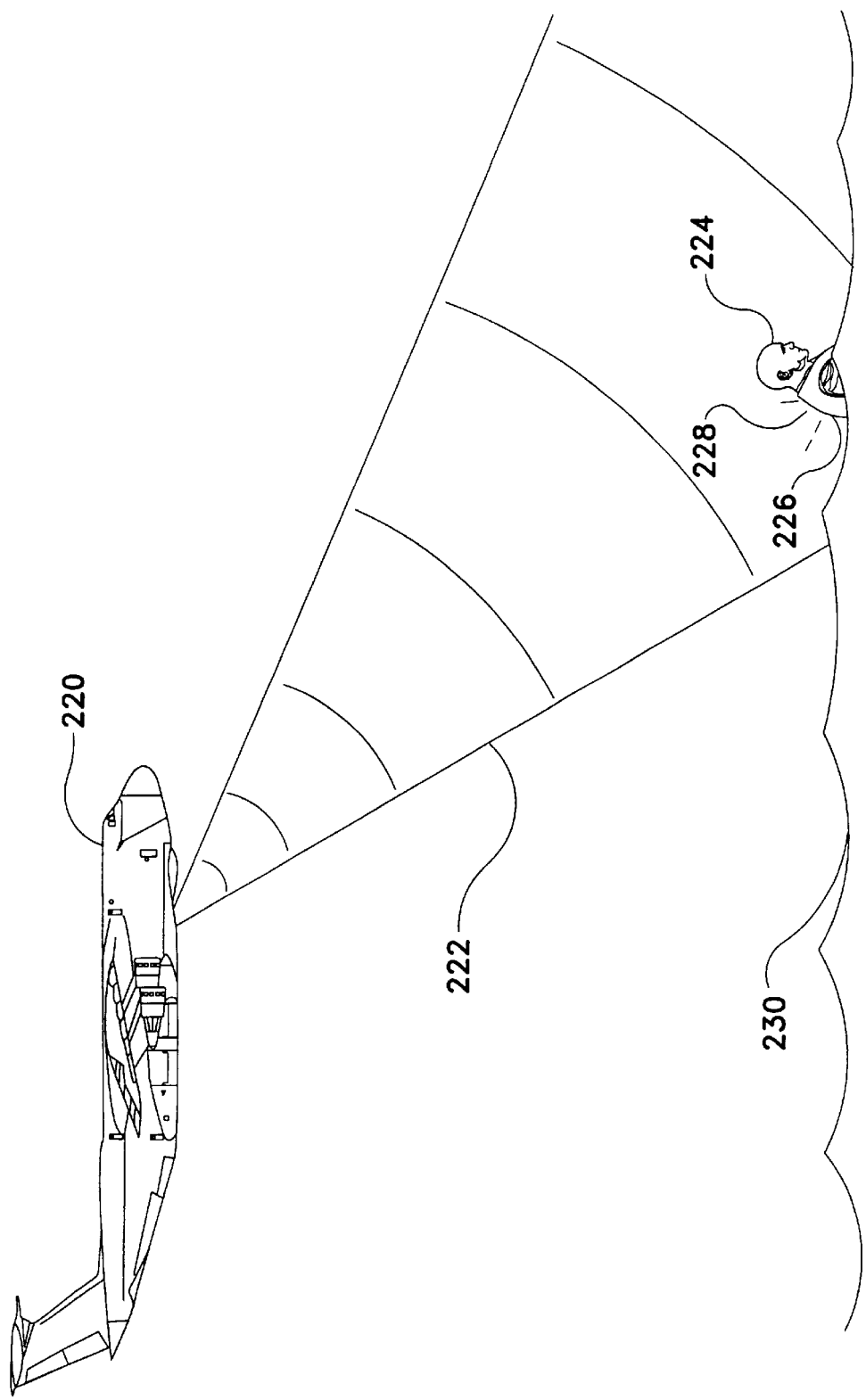
FIG. 15 is a side view of a search and rescue aircraft with a laser according to the invention locating an individual in the sea.

FIG. 15 shows an aircraft 220 using a laser lighting unit for projecting a laser beam 222 to assist in locating a missing person 224 at sea 230. In this case the missing person 224 is wearing a life vest 226 with a covering that reflects laser light 228 to enable observers in the aircraft 220 to readily identify the location of the individual. Obviously, the laser lighting unit may also be employed by a ship in the sea 230.

Figure 16:
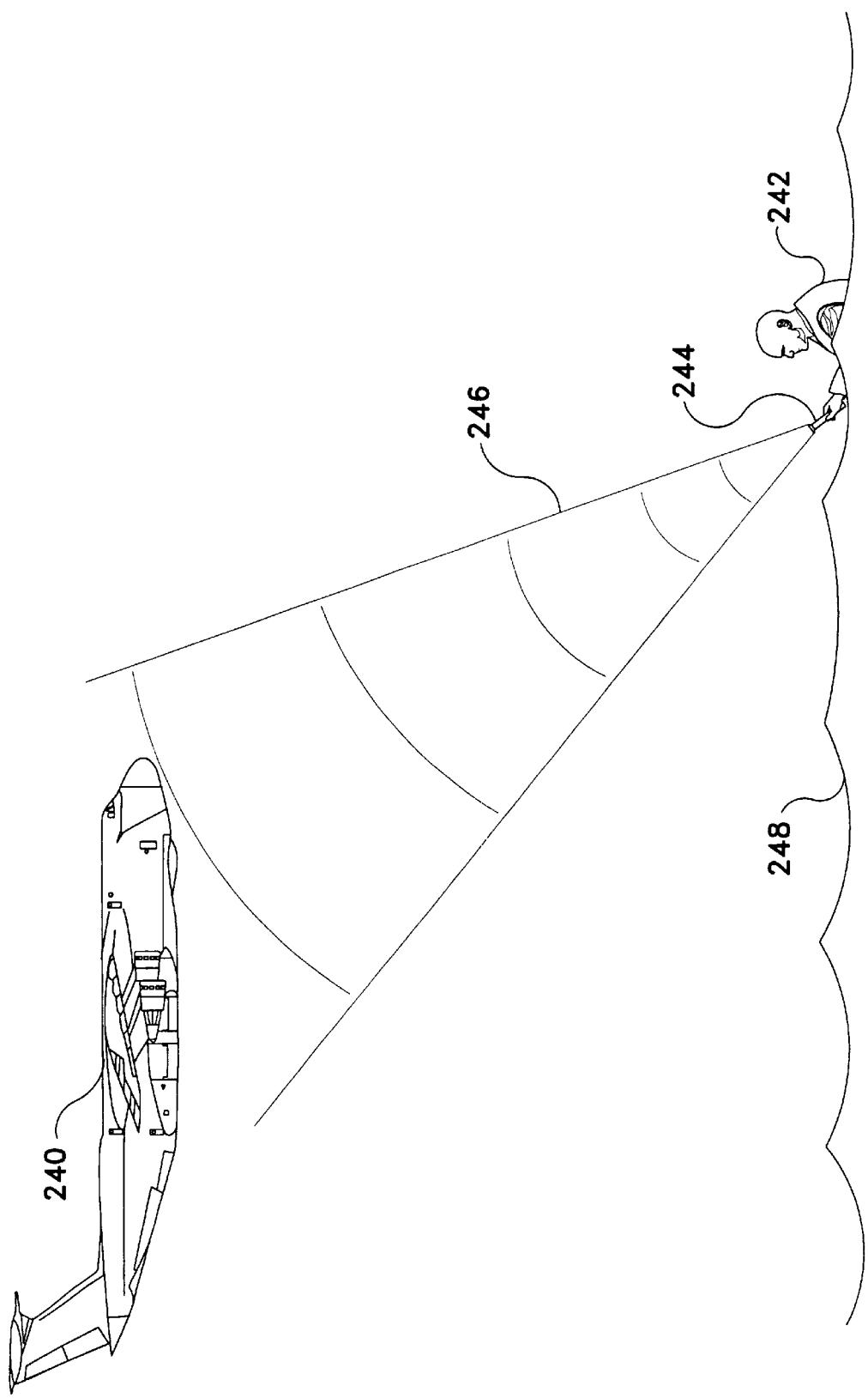
FIG. 16 is a side view of an individual using a laser lighting unit according to the invention to alert an overflying aircraft.

FIG. 16 shows a missing person 242 in the sea 248 using a laser lighting unit 244 for projecting a laser beam 246 to assist the individual 242 in being identified by an overflying aircraft 240. In this case the missing person 242 projects the laser beam 246 which will enable observers in the aircraft 240 to readily identify the location of the individual 242. Obviously, the laser lighting unit 244 may also be employed to assist the individual 242 in being identified by a ship in the sea 248.

Figure 17:
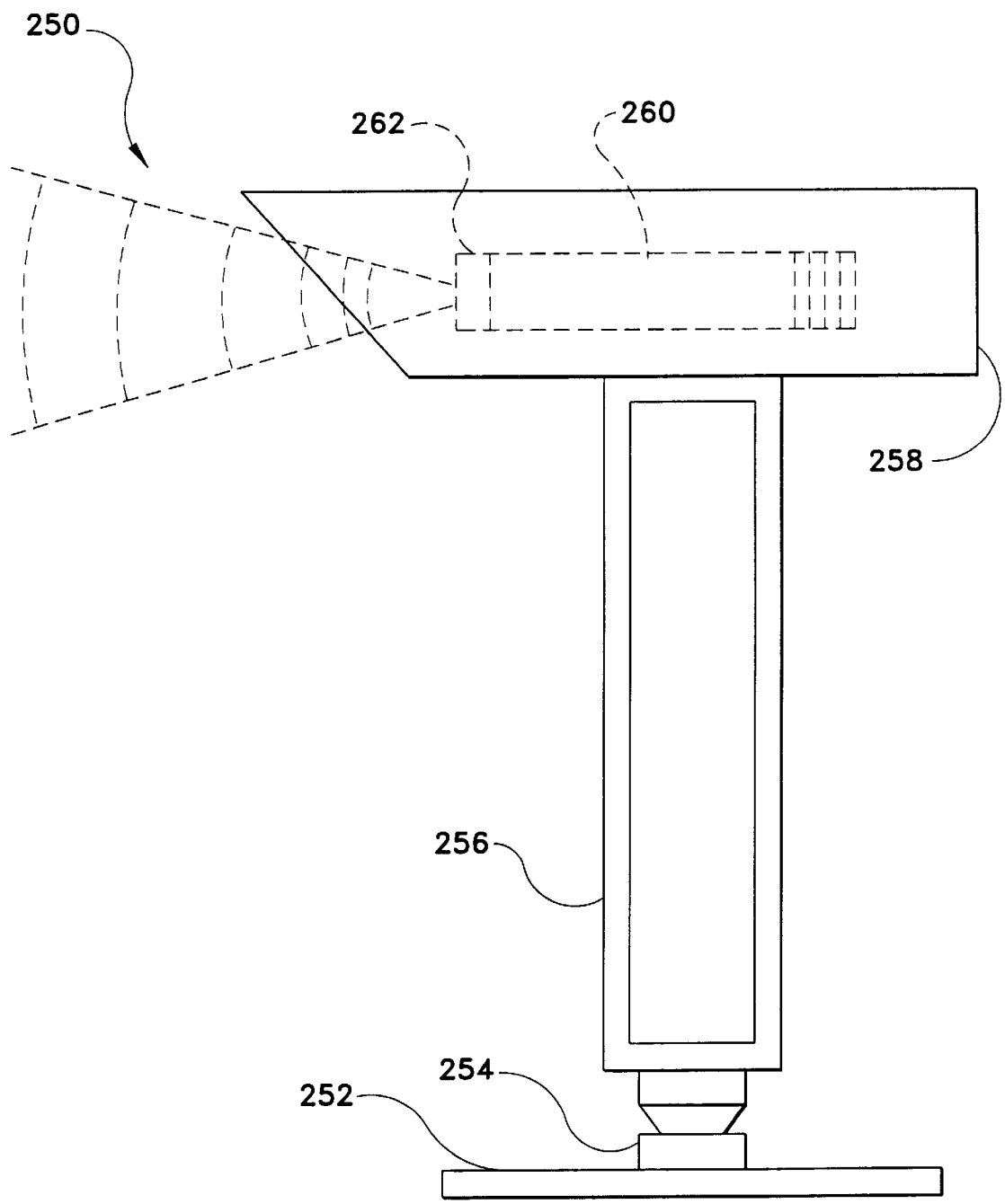
FIG. 17 is a side view of a laser lighting post according the invention.

FIG. 17 shows another laser lighting post 250 according to the invention for providing radiation along a surface. The laser lighting post 250 includes one laser 260 mounted in a housing 258 for producing a beam of coherent visible or reflective radiation and a glass plano-convex cylindrical lens 262 which has an aspherical convex cylindrical surface for generating a laser line which is uniformly illuminated from end to end. The laser lighting post 250 also includes a mounting column 256 which has an access door for providing access to a tilt switch assembly and an AC/DC power adapter unit. The mounting column 256 is attached to a base plate 252 by a frangible coupling 254.

Figure 18A:
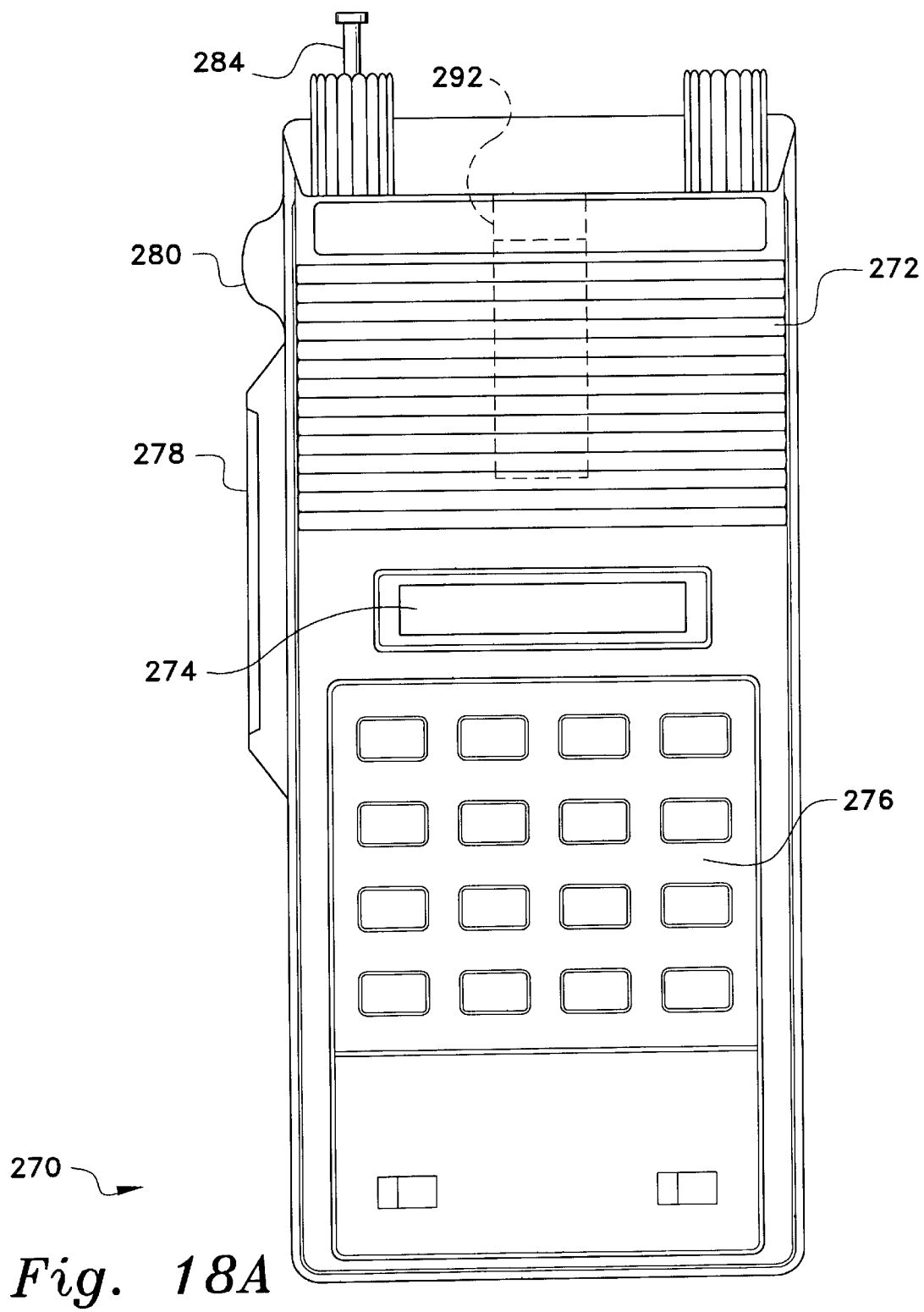
FIG. 18A is a front view of one type of VHF transceiver equipped with a laser lighting unit according to the invention.
Figure 18B:
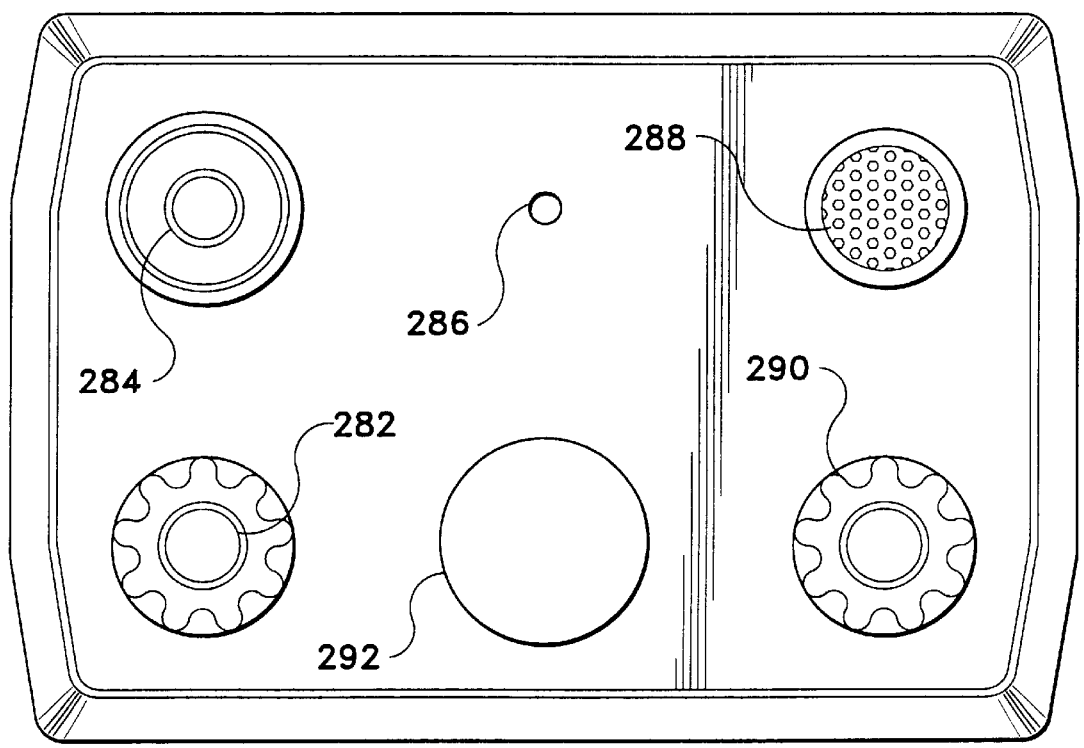
FIG. 18B is a top view of the VHF transceiver shown in FIG. 18A.

Another device useful for search and rescue operations includes a handheld radio transceiver equipped with a laser lighting unit. One type of radio transceiver is shown in FIGS. 18A and 18B. This radio transceiver 270 includes a casing having mounted therein a speaker/microphone 272, a display 274, a plurality of input keys 276 representing at least the numbers zero through nine and other function or data entry keys, a push to talk key 278, a laser 292, and a key 280 to activate or deactivate the laser 292. The top of the casing is shown in FIG. 18B and includes power and volume knob 282, an antenna 284, an indicator light 286, earphone jack 288, frequency selector dial 290, and a laser 292.

Elements contained within the transceiver include a transmitter, a receiver, a discriminator, an analog to digital and digital to analog converter, a digital logic controller, and a T memory. Radio signals are coupled to and from open space via the antenna 284. Typical transceiver functions include signal detection, modulation, demodulation, amplification, and noise reduction. Carrier frequencies are provided by a frequency synthesizer which is controlled by the digital logic controller. The transceiver is powered by standard or rechargeable batteries.

Another type of handheld radio transceiver is shown in FIG. 19. This radio transceiver 300 is substantially the same as the transceiver shown in FIGS. 18A and 18B. The transceiver 300 includes a casing having mounted therein a speaker/microphone 302, a display 304, a plurality of input keys 306 representing at least the numbers zero through nine and other function or data entry keys, and a push to talk key 308. However, this transceiver also includes a handpiece 312 with a laser 319 mounted therein. The laser 319 has a lens 321 which is a glass plano-convex cylindrical lens having an aspherical cylindrical convex surface which is critical for generating a laser line which is uniformly illuminated from end to end, and an external waterproof lens 323. The handpiece 312 is connected to the transceiver 300 by a cord 310 and includes a speaker/microphone 318, a push to talk key 316, the laser 319, and a key 314 to activate or deactivate the laser 319.

Figure 21:
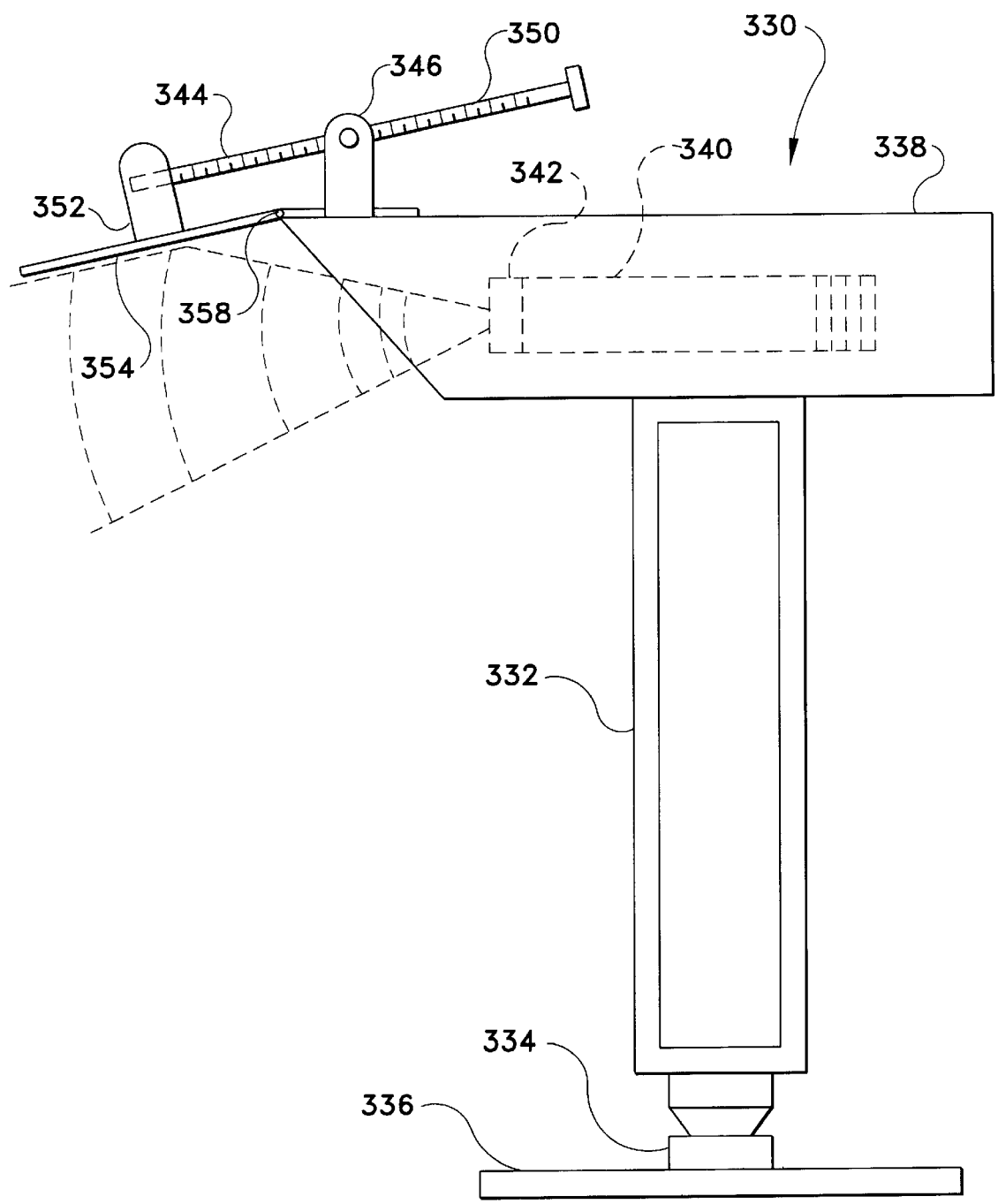
FIG. 21 is a side view of a laser lighting post equipped with one type of adjustable shield according to the invention.

FIG. 21 shows another laser lighting post 330 according to the invention for providing radiation along a surface. The laser lighting post 330 includes one laser 340 mounted in a housing 338 for producing a beam of coherent visible or reflective radiation and a glass plano-convex cylindrical lens 342 which has an aspherical convex cylindrical surface for generating a laser line which is uniformly illuminated from end to end. The laser lighting post 330 also includes an adjustable shield 354 which may be manually adjusted up or down about pivot point 358 via rotation of the shaft 344 of threaded member 350. Threaded member 350 passes between element 346 and element 352. The laser lighting post 330 also includes a mounting column 332 which has an access door for providing access to a tilt switch assembly and an AC/DC power adapter unit. The mounting column 332 is attached to a base plate 336 by a frangible coupling 334.

Figure 22:
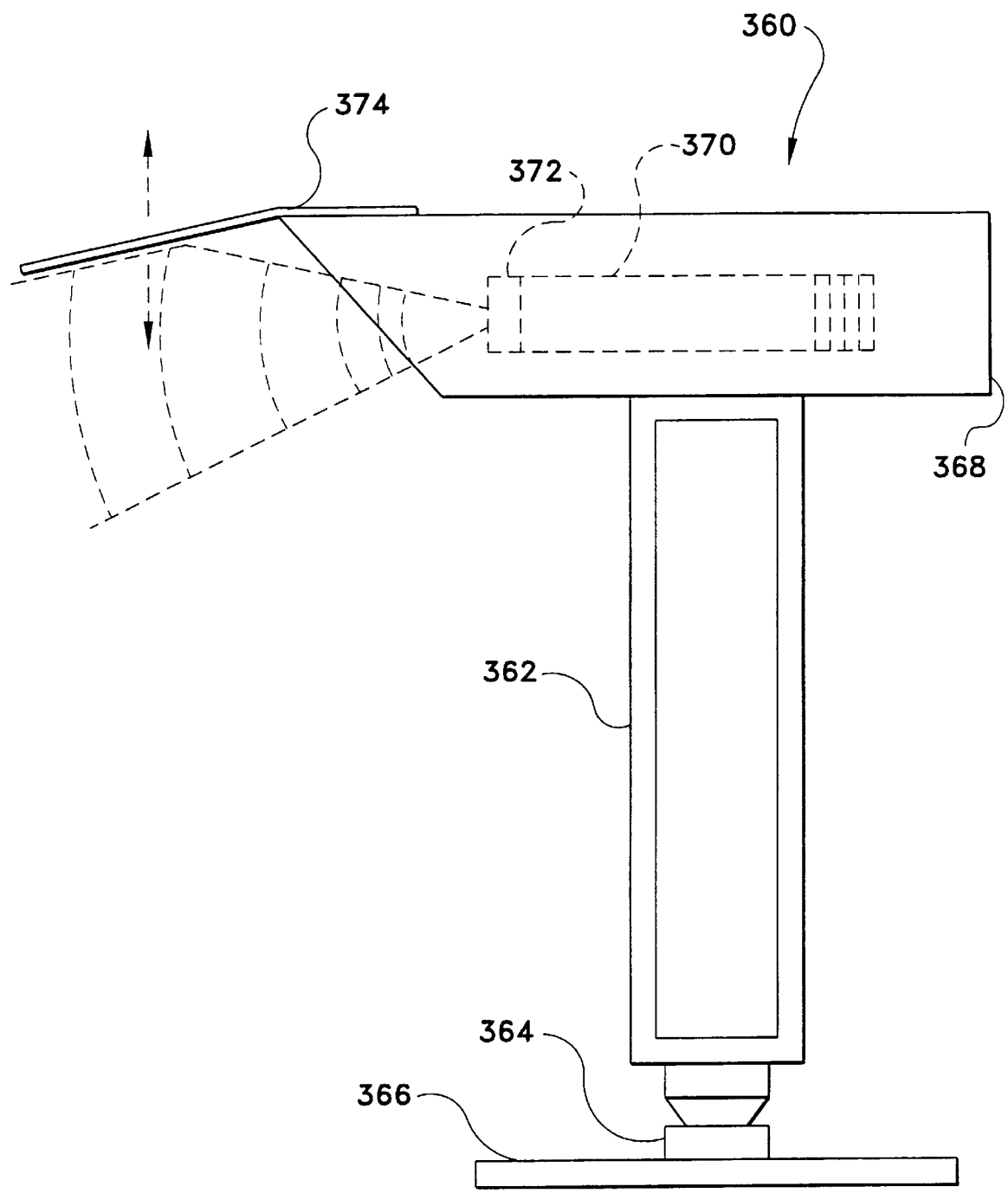
FIG. 22 is a side view of a laser lighting post equipped with another type of adjustable shield according the invention.

FIG. 22 shows another laser lighting post 360 according to the invention for providing radiation along a surface. The laser lighting post 360 includes one laser 370 mounted in housing 368 for producing a beam of coherent visible or reflective radiation and a glass plano-convex cylindrical lens 372 which has an aspherical convex cylindrical surface for generating a laser line which is uniformly illuminated from end to end. The laser lighting post 360 also includes an bendable adjustable shield 374 which may be manually adjusted up or down by applying force to the free end of the shield up or down. The laser lighting post 360 also includes a mounting column 362 which has an access door for providing access to a tilt switch assembly and an AC/DC power adapter unit. The mounting column 362 is attached to a base plate 366 by a frangible coupling 364.

Figure 20:
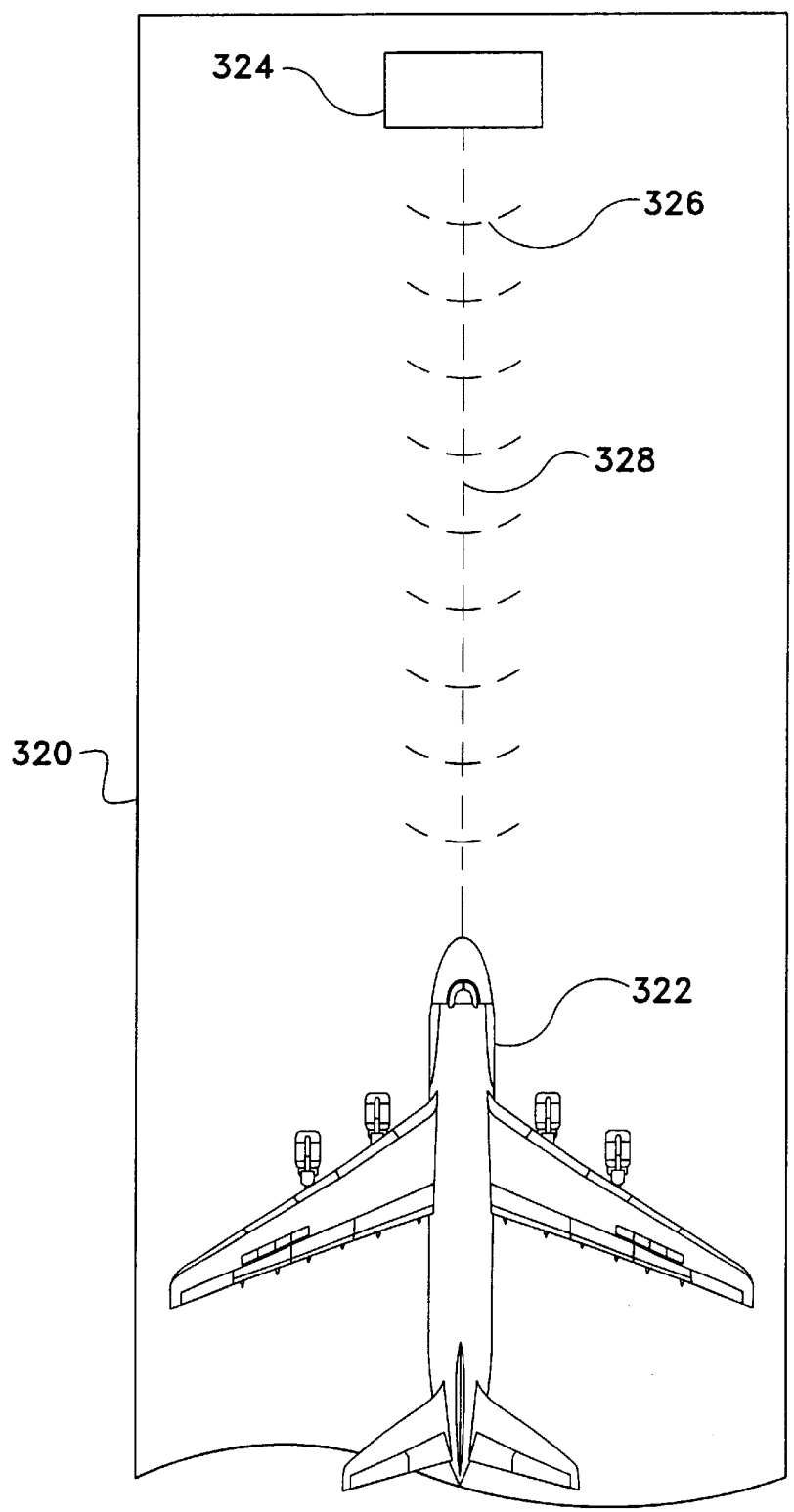
FIG. 20 is a top view of an aircraft on a runway equipped with a doppler radar configured with a laser lighting unit according to the invention.
Figure 23:
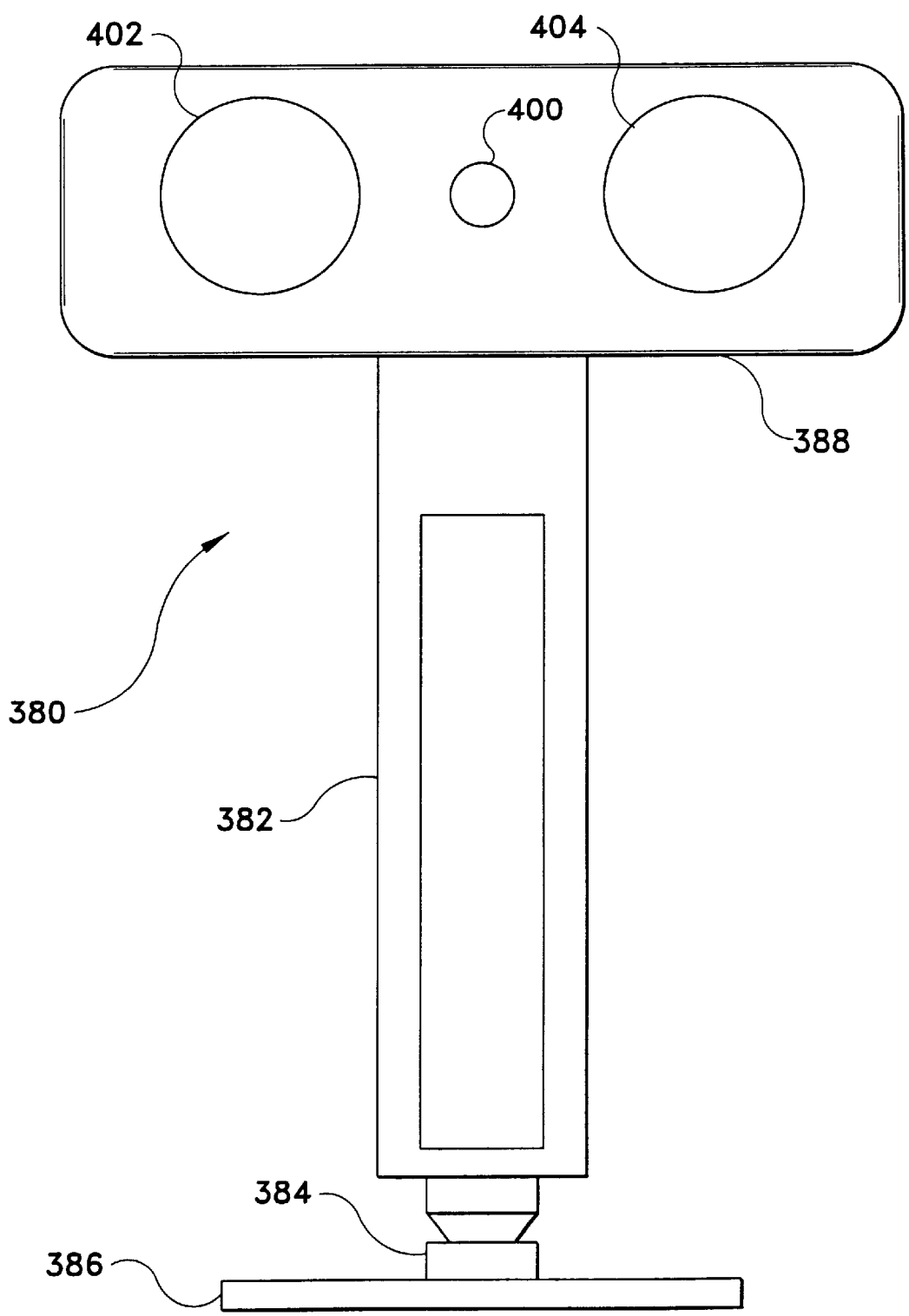
FIG. 23 is a front view of a laser lighting post equipped with a radar device according to the invention.
Figure 24:
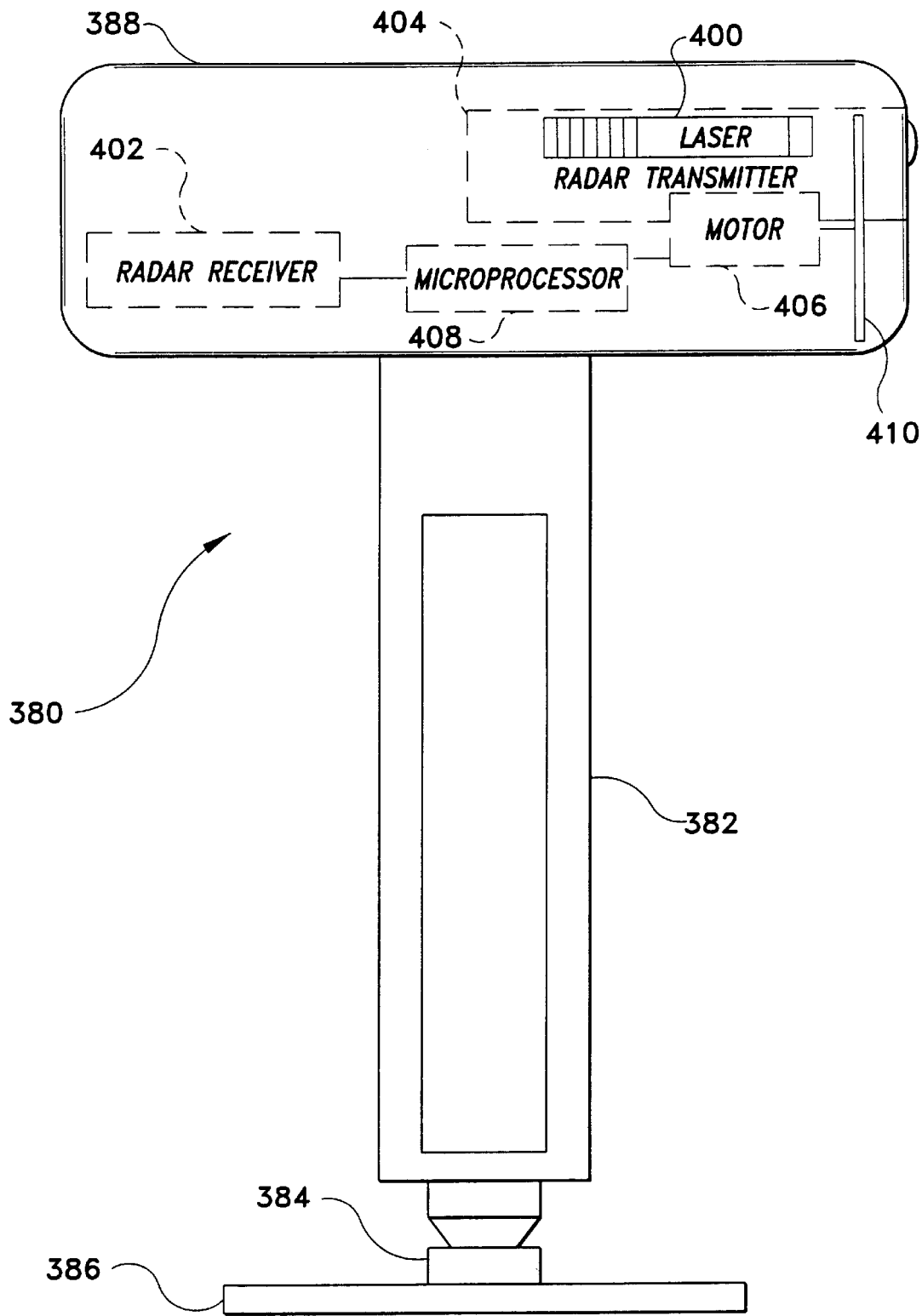
FIG. 24 is a side view of the laser lighting post shown in FIG. 23.
Figure 25:
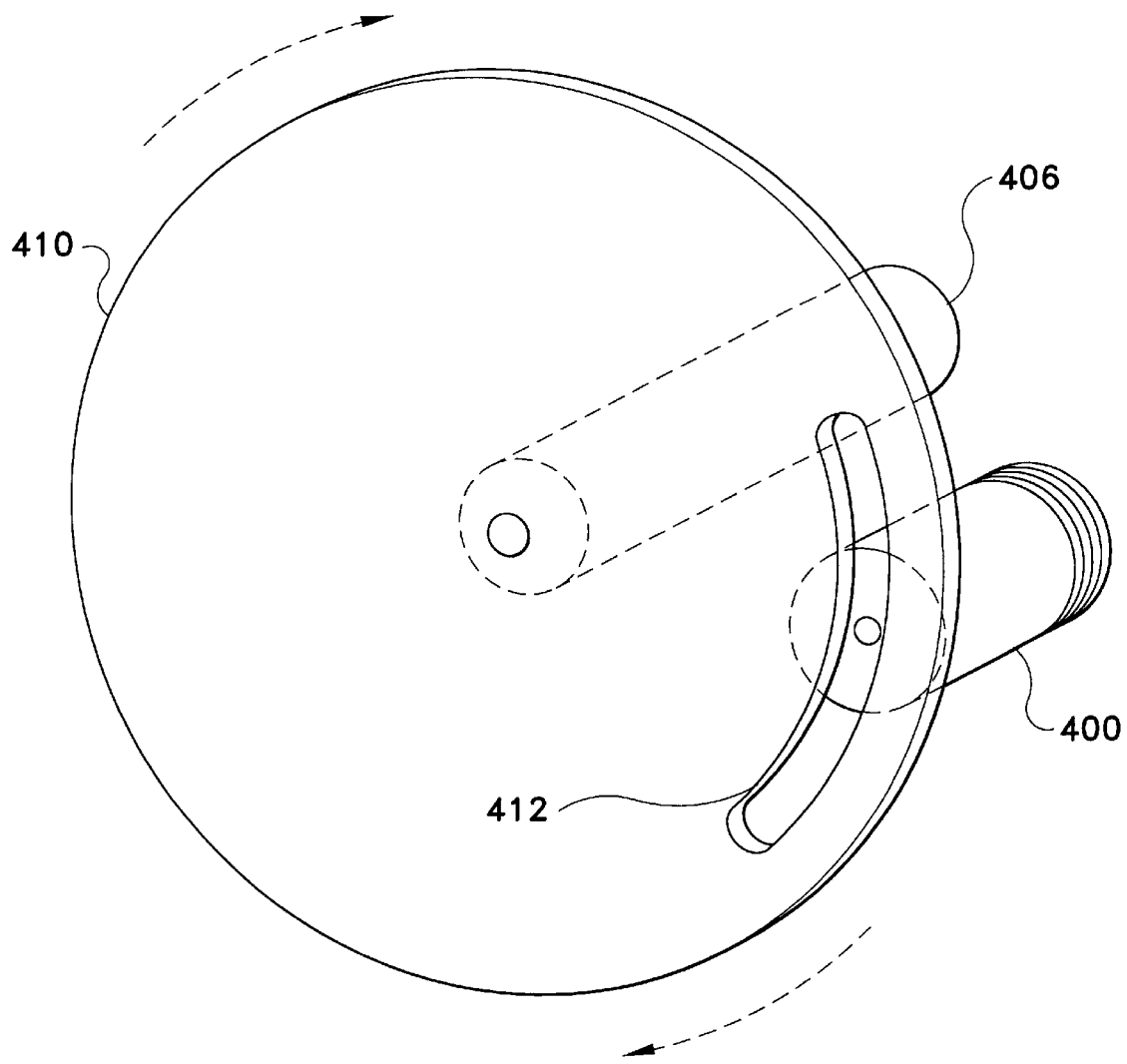
FIG. 25 is perspective view of the perforated disk and laser contained within the laser lighting post shown in FIG. 23.

Another laser lighting post according to the invention may be equipped with a radar device for providing pulses of radiation along a surface based on the detected ground speed of an approaching aircraft. As shown in FIG. 20, a laser lighting post 324 equipped with a radar device and positioned along the centerline of a runway 320 transmits a radar beam 326, upon which the speed of the aircraft 322 may be determined. The laser lighting post 324 then transmits a pulsed laser sequence 328 relative to the speed of the oncoming aircraft 322. The crew on the aircraft 322 would perceive these pulses as standard airport centerline striping. This pulsed laser sequence could be utilized throughout an entire airport system on runways, taxiways, stop bar lines, hold short lines and other controlling situations. Details of such a laser lighting post are shown in FIGS. 23, 24, and 25. The radar device mounted on the laser lighting post 324 transmits a radar beam 326 from radar transmitter 404 that returns to radar receiver 402 upon hitting the aircraft 322, upon which the speed of the aircraft may be determined. The laser lighting post 380 includes a mounting column 382 which has an access door for providing access to a tilt switch assembly and an AC/DC power adapter unit. The mounting column 382 is attached to a base plate 386 by a frangible coupling 384. A top element 388 is mounted to the top of the mounting column 382. The top element 388 includes one laser 400 for producing pulsed beams of coherent visible or reflective radiation relative to the ground speed of an approaching aircraft. The laser 400 includes a glass plano-convex cylindrical lens which has an aspherical convex cylindrical surface for generating a laser line which is uniformly illuminated from end to end. The laser lighting post 380 may also be provided with adjustable shields as described above. The laser lighting post generates a pulsed laser sequence by interconnecting a microprocessor 408 with a motor 406 attached to a perforated disk 410. The microprocessor 408 controls the speed of the motor 406 according to the speed of a detected vehicle. The perforated disk 410 rotates at the motor speed and is pulsed by means of the slot 412 in the disk 410.

Figure 26:
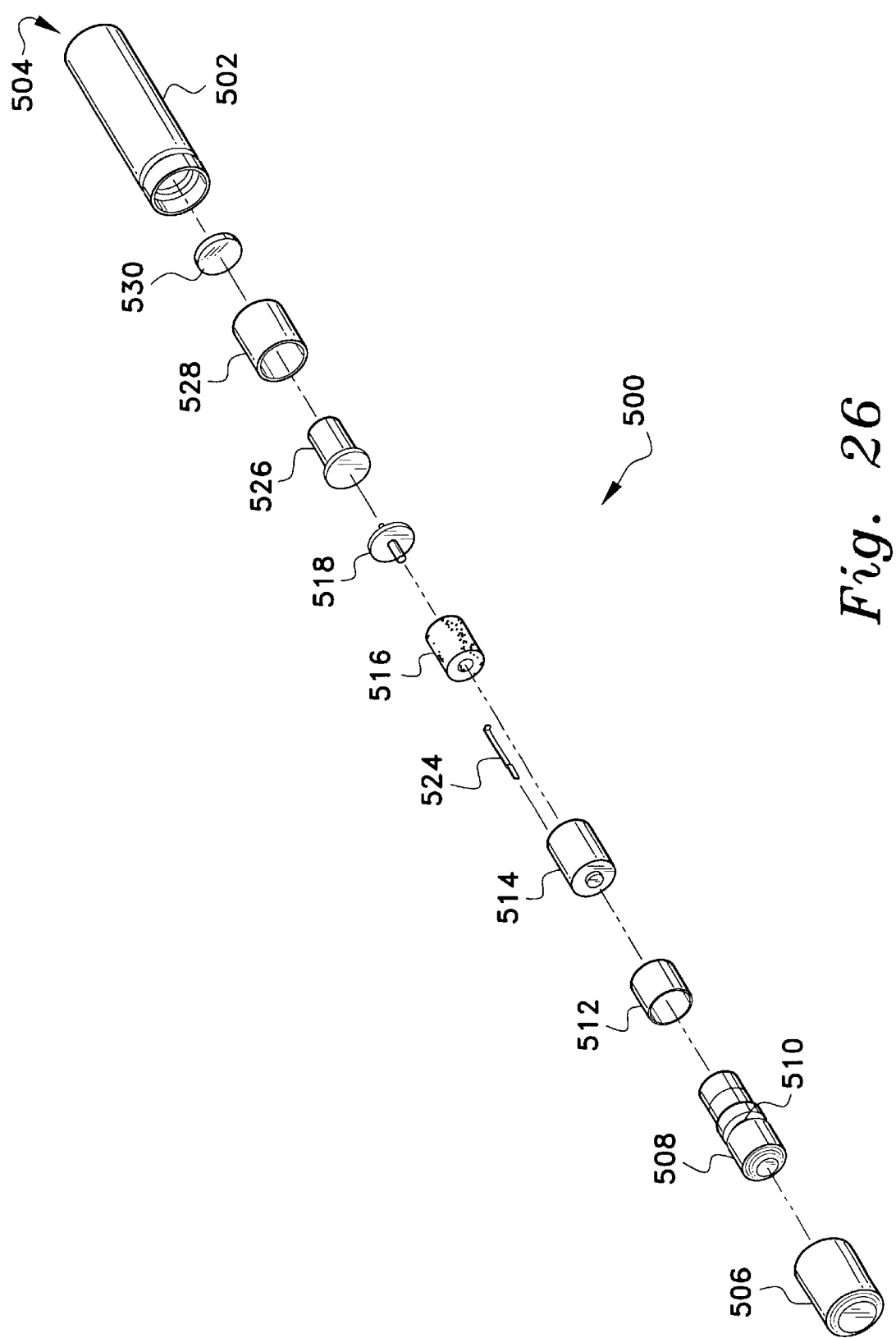
FIG. 26 is an exploded perspective view of a handheld laser flare according to the present invention.
Figure 27:
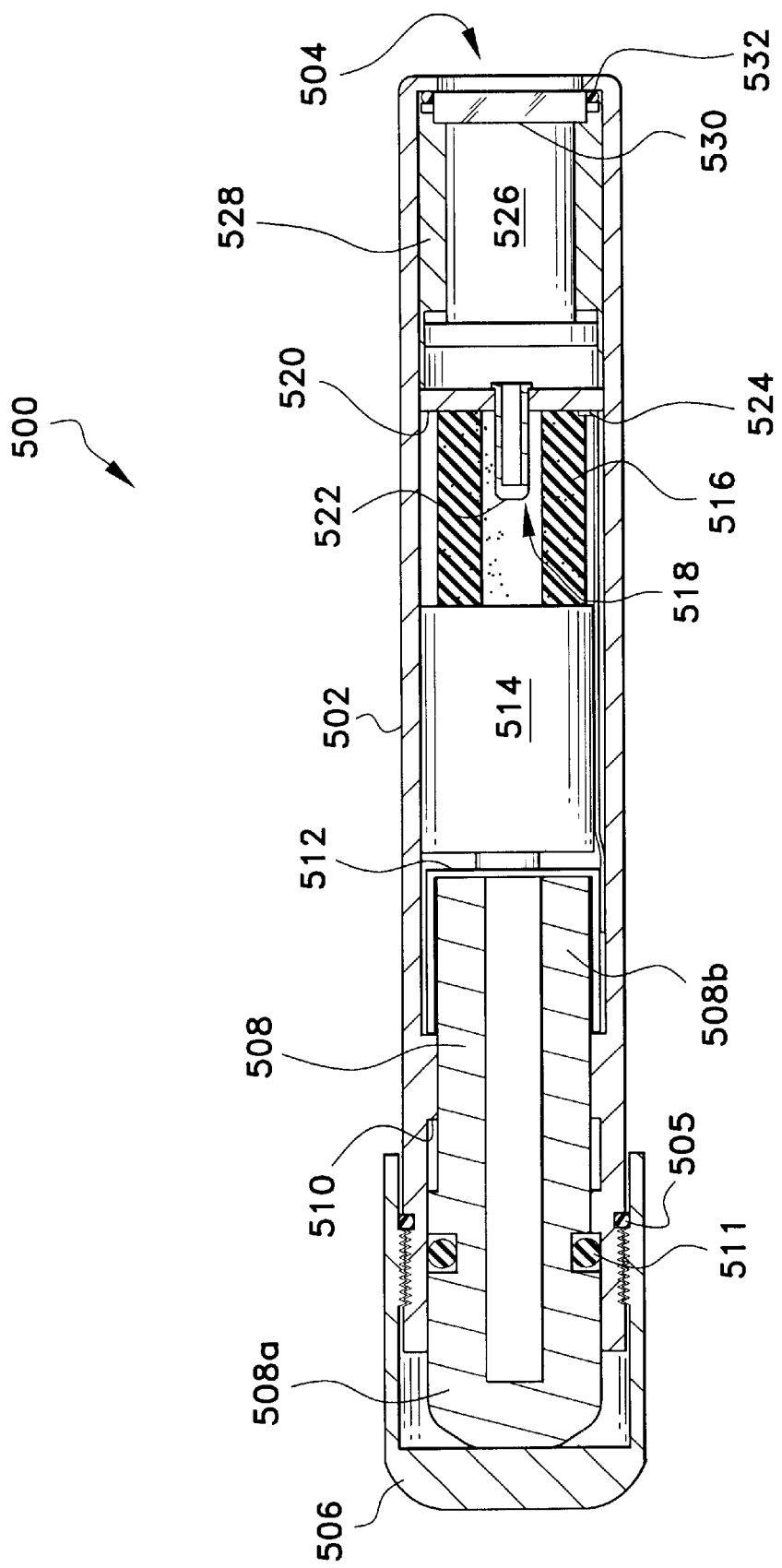
FIG. 27 is a sectional view of the handheld laser flare of FIG. 26.

FIGS. 26–27 show a handheld laser flare 500 according to the present invention. The flare uses a light source which employs visible, invisible and reflective laser light sources for the illumination, recognition, and identification of retroreflective markings and materials on airport runways and taxiways, preferred approach and departure routes, seaplane base landing areas, marine waterways, buoys, channel markers, flotation devices, life rafts, and for assisting in search and rescue operations. The primary use of the flare is for search and rescue. A principal design feature is that the handheld device is waterproof.

More particularly, the handheld flare 500 includes a cylindrical housing 502 with an open port 504 at one end and a threaded cap 506 disposed over a plunger switch 508 at the opposite end. An O-ring 505 is disposed in an annular groove in the exterior of the housing to form a waterproof seal when the cap 506 is threaded onto the housing. The plunger 508 is slidable in a cavity defined by the housing 502. The cavity has a relatively wide diameter proximate the cap end of the housing 502 and a relatively narrow diameter thereafter, the housing 502 defining a shoulder 510 between the wide and narrow portions of the cavity. The plunger 508 has a wide diameter upper end 508a with an O-ring 511 disposed about its circumference to form a watertight seal with the housing 502, and a relatively narrow diameter lower end 508b with a metal cap 512 disposed about the lower end 508b. A six volt lithium battery 514 is disposed below the plunger 508 with the positive electrode oriented to contact the metal cap 512.

A foam washer 516 is disposed between the negative electrode of the battery 514 and a laser contact 518 having a circular base 520 and a spring biased rod 522 disposed through the center of the circular base 520, the rod 522 and the circular base being electrically insulated from each other. A contact strip 524 has a first end in contact with the metal cap 512 and a second end in contact with the circular base 520, the body of the contact strip 524 being flat so that may extend between the battery 514 and the housing 502. A laser diode 526 in a conventional package is disposed in a diode housing 528 below the laser contact 518. The opposite end of the diode housing 528 supports a lens 530 in spaced apart relation from the diode 526 adjacent the open port 504. An O-ring 532 is disposed about the lens 530 between the diode housing 528 and the flare housing 502 to form a waterproof seal.

The lens 530 is a line generating optic comprising a plano-convex cylindrical lens having an aspherical cylindrical convex surface which is critical for generating a laser line which is uniformly illuminated from end to end. Conventional cylindrical lens employ a spherical cylindrical convex surface which, when employed with lasers, results in a Gaussian line, i.e. brighter in the center and dim at the outer ends. When this spherical cylindrical convex surface is altered, or aspherized, to the proper parameters, the resultant projected laser line becomes uniformly illuminated from end to end. The lens 530 may be made from glass or from any appropriate thermoplastic material known in the optical art, such as polymethyl methacrylate (PMMA). The plastic materials have the advantage of low cost, light weight, outstanding optical clarity, durability, good impact strength, and excellent weatherability and UV resistance.

In use, the foam washer 516 has sufficient resilience to normally bias the battery 514 and plunger 508 towards the end cap 506. When it is desired to activate the flare 500, the end cap 506 is removed and the plunger 508 is depressed until the wide diameter end 508a rest against the annular shoulder 510. This depresses the battery 514 and compresses the foam washer 516 so that the negative electrode of the battery 514 depresses the center rod 522 to contact the diode 526, closing the circuit. Continuity between the positive electrode of the battery 514 and the diode 526 is constantly maintained via the end cap 512, contact strip 524, circular base 520, and conductive diode housing 528. When the plunger 508 is released, the spring biased center rod 522 is released from contact with the diode 526 and returns to its normal position, and the foam washer 516 is sufficiently resilient to decompress and expand to its original length, raising the plunger 508.

The handheld laser flare 500 may be used in search and rescue operations in a variety of ways. The flare 500 may be used by a person in distress to signal to a search party or to reflect a beam from clouds overhead to mark his position. Alternatively, the flare 500 may be used by searching parties from aircraft, boats, or other vehicles, or by persons on foot to reflect from retroreflective markers or material attached to boats, life rafts, Mae Wests, jackets or life vests, and the like. The weatherproof seal formed by the O-rings 505, 511 and 532 make the device particularly useful for marine applications.

Figure 28:
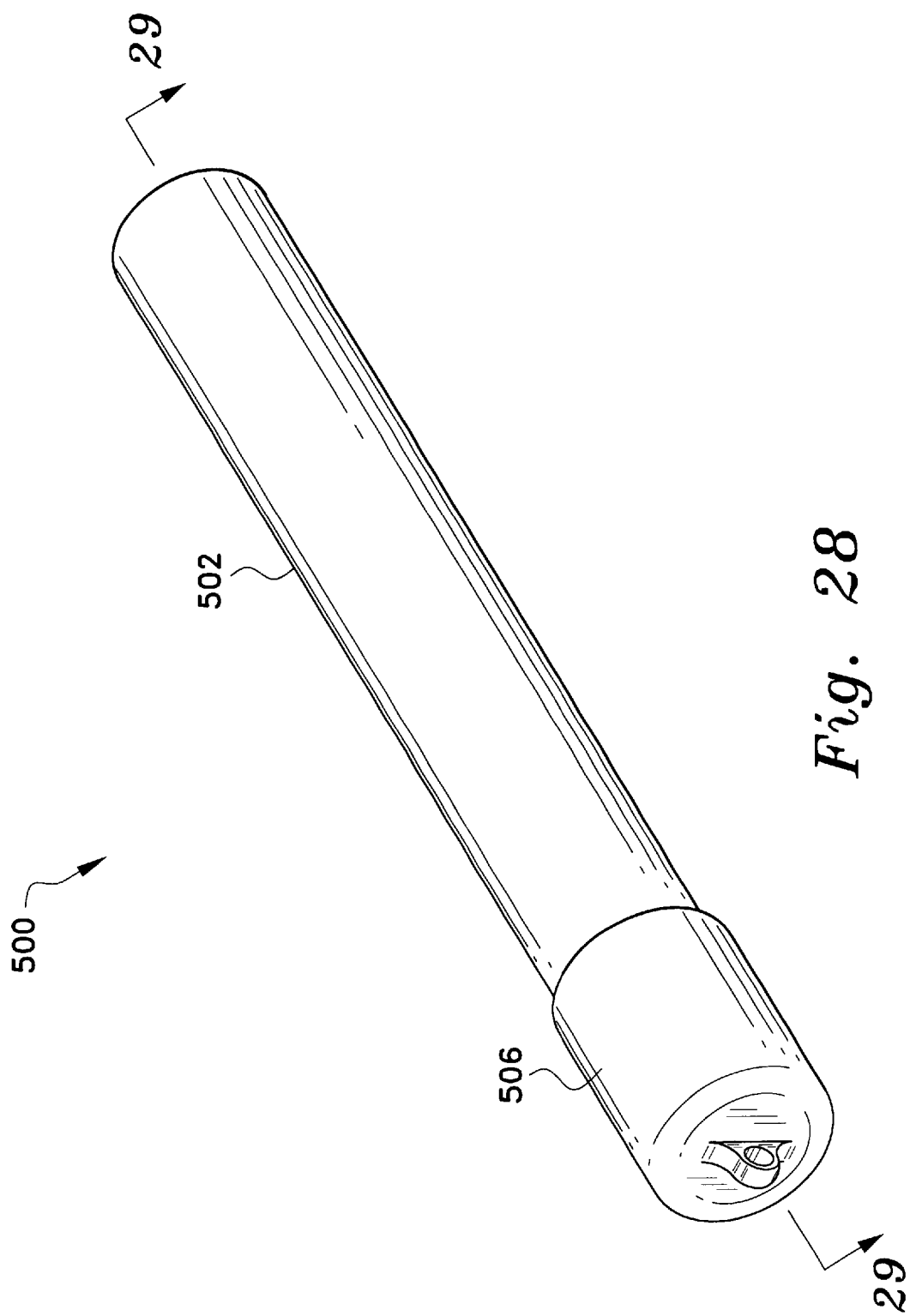
FIG. 28 is a perspective view of an alternative embodiment of a handheld laser flare according to the present invention.
Figure 29:
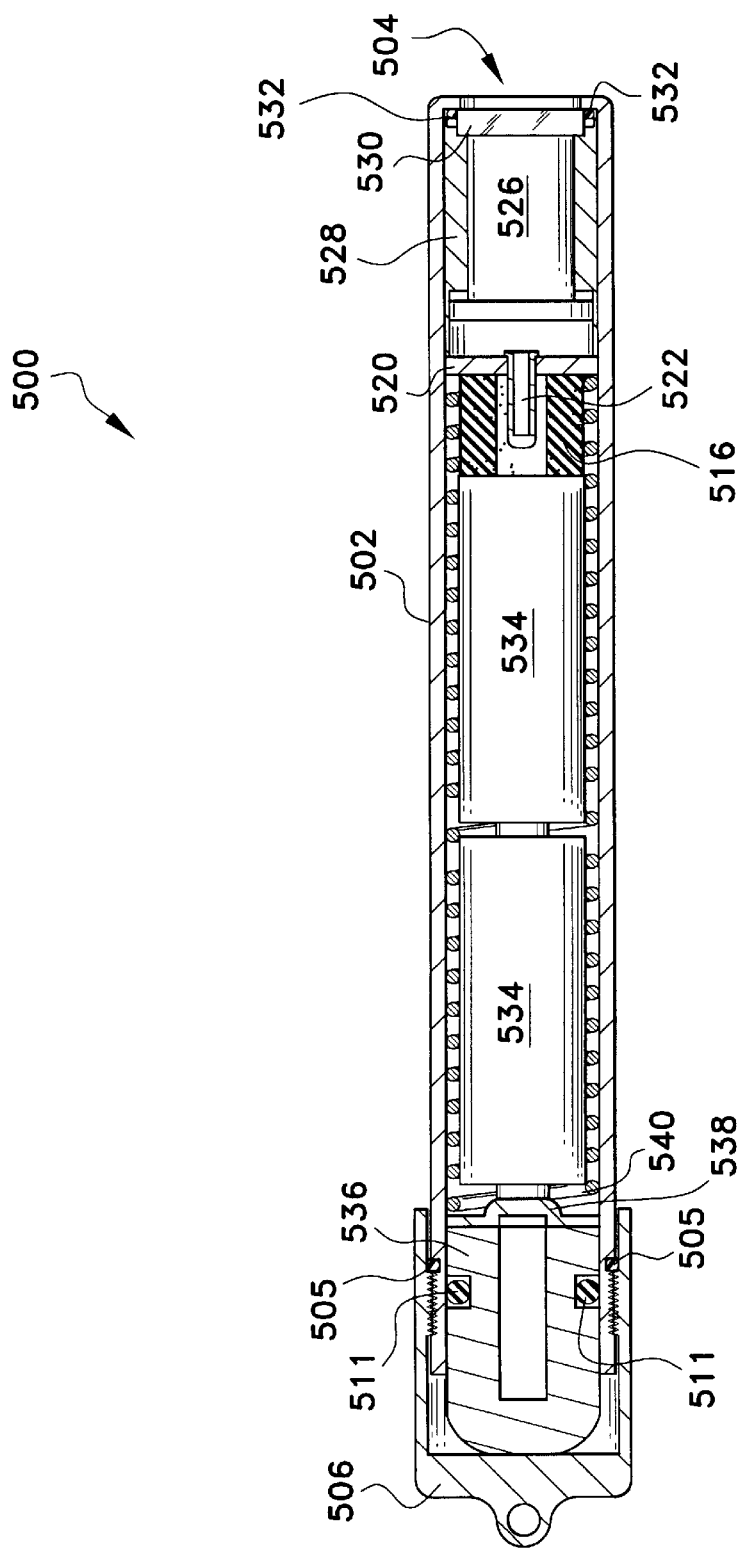
FIG. 29 is a section view along the lines 29—29 of FIG. 28.

FIGS. 28–29 show an alternative embodiment of the handheld laser flare 500 which is substantially identical to the flare 500 shown in FIGS. 26–27, except that the plunger switch has a different structure and the power supply is different. As shown more particularly in FIG. 29, in this embodiment the power supply is formed by two AA batteries 534 in series. The plunger 536 is shorter in length, and has a bottom contact surface 538 which is either made in one piece with the plunger 536, or is provided by a metal cap 512 slidable over the bottom of the plunger 536, which remains in contact with the positive electrode of the top battery 534. The contact strip 524 is replaced by a helical compression spring 540 which extends between the plunger 536 and the circular base 520 of the diode contact 518 and the diode housing 528, encircling the batteries 534. When the plunger 536 is depressed, the helical spring 540 is depressed so that the bottom of the plunger 536 drives the batteries 534 down, compressing the foam washer 516 so that the negative electrode of the bottom battery 534 contacts spring biased metal rod 522, driving the metal rod 522 into contact with the diode 526 and completing the circuit. When the plunger 536 is released, the spring 540 expands to return the plunger 536 to its original position, the foam washer 516 being resilient enough to raise the batteries 534 break electrical contact with the center rod 522, the center rod 522 returning to its original position.

Figure 30:
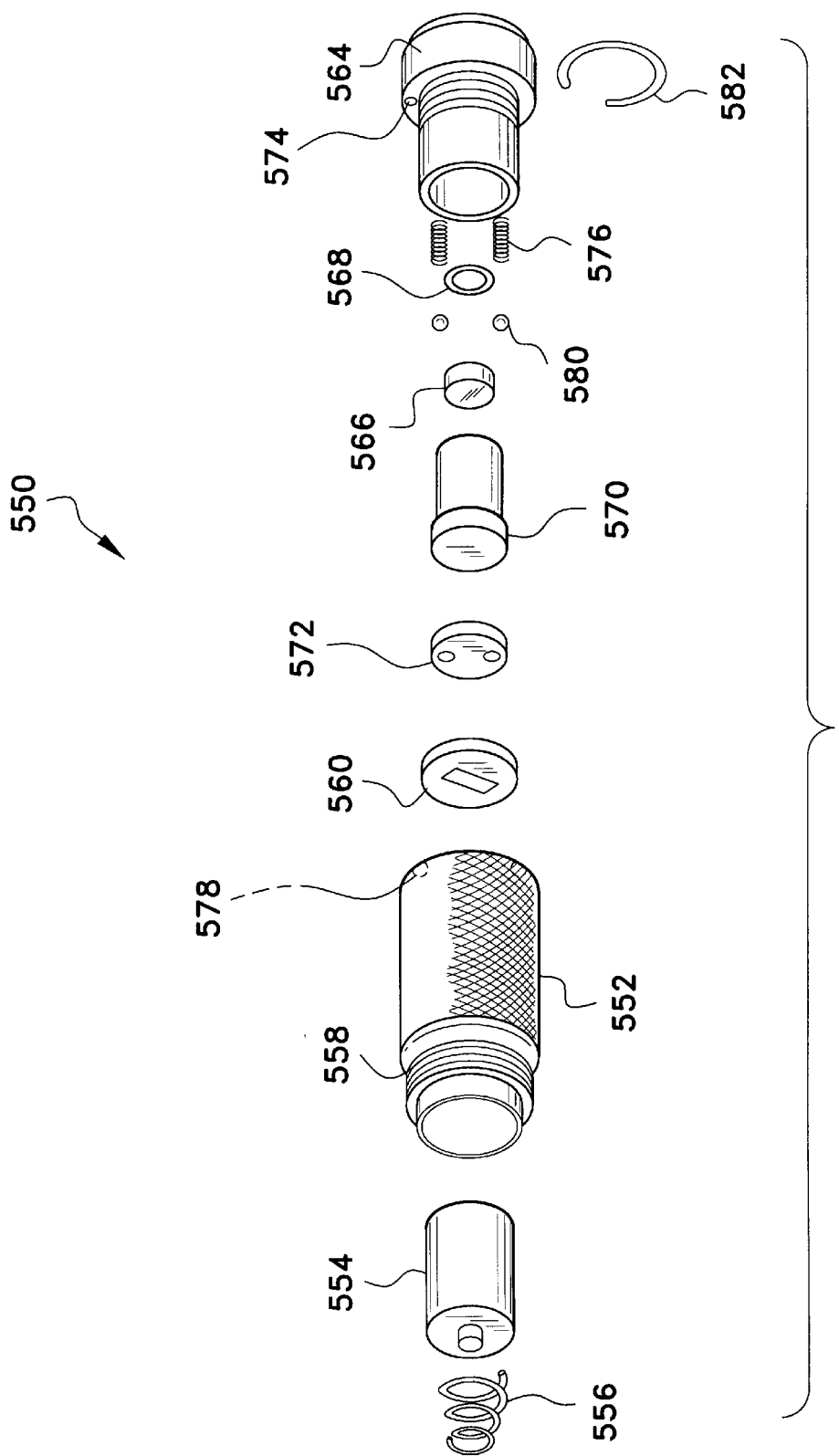
FIG. 30 is an exploded view of a handheld laser flare attachment according to the present invention.

It will be obvious to those skilled in the art that other switches may be used with the cylindrical housing 502 and laser diode 526 and waterproof seals which retain the functionality of the lightweight cylindrical body and the lens 530 which emits a beam forming a line on a planar object with the path of the beam. For example, FIG. 30 shows a handheld laser flare attachment 550 which is operable as an independent unit, or which may be attached to the end of a conventional flashlight, such as a Mini Maglite® made by Mag Instrument, Inc. of Ontario, Calif.

The handheld laser flare attachment 550 has a cylindrical housing or case including a case body 552 which houses a single battery 554. A contact spring 556 is threaded into one end of the body 552 so that the positive electrode of the battery 554 bears against the contact spring 556 and places the case 552 at a positive potential. This end of the body 552 is externally threaded so that the case 552 may be attached to a conventional flashlight case in place of the conventional end cap with the contact spring 556 bearing against the flashlight batteries. An O-ring 558 is placed in a groove at the base of the threads to form a waterproof seal attachment to the flashlight. A negative contact plate 560 is placed in the other end of the body 552 to bear against the negative electrode of the battery 554.

The flare attachment 550 includes a head assembly 562 which is attached to the opposite end of the case 552. The head assembly 562 includes a cylindrical rotating head 564, an optic lens 566, and O-ring 568 to provide a waterproof seal between the lens 566 and the head 564, a laser diode 570, and a negative rotator contact 572. The head 564 has a wide diameter outer rim and a narrow diameter neck extending rearward from the rim which telescopes into the case 552. The head 564 has a pair of wells 574 separated 180° about the rim of the head 564 in which a pair of detent springs 576 are housed. The end of the case 552 has four hemispherical depressions 578 defined in its rim which are separated by 90° radially about the rim. A pair of ball bearings 580 are placed between the springs 576 and the rim of the case 552 so that the head assembly 562 rotates between a first detent position in which the battery's negative contact plate 560 is aligned with the rotator contact plate 572 in order to apply a negative voltage to the laser diode 570, and a second detent position in which the contacts on the rotator contact plate 572 are 90° from the first position and are not aligned with the battery contact plate 560, thereby removing power from the diode 570. A snap ring 582 is placed on the neck of the head 564 and expands into an internal groove in the case 552 to lock the head assembly 562 to the case 552 and permit free rotation of the head assembly 562.

The optic lens 566 is a line generating optic comprising a plano-convex cylindrical lens having an aspherical cylindrical convex surface which is critical for generating a laser line which is uniformly illuminated from end to end. Conventional cylindrical lens employ a spherical cylindrical convex surface which, when employed with lasers, results in a Gaussian line, i.e. brighter in the center and dim at the outer ends. When this spherical cylindrical convex surface is altered, or aspherized, to the proper parameters, the resultant projected laser line becomes uniformly illuminated from end to end. The lens 566 may be made from glass or from any appropriate thermoplastic material known in the optical art, such as polymethyl methacrylate (PMMA). The plastic materials have the advantage of low cost, light weight, outstanding optical clarity, durability, good impact strength, and excellent weatherability and UV resistance.

It is to be understood that the present invention is not limited to the embodiments described above, but encompasses any and all embodiments within the scope of the following claims.

I claim:

1. A handheld laser lighting unit for providing radiation along a surface comprising:
   (a) a case;
   (b) a power supply disposed in said case;
   (c) at least one laser disposed in said case;
   (d) switch means for connecting and disconnecting said power supply to said laser; and
   (e) line generating means for generating a laser line which is uniformly illuminated from end to end;
   wherein said case is sized and dimensioned for transport and use with a single hand.

2. The handheld laser lighting unit according to claim 1, wherein said at least one laser comprises a single laser diode.

3. The handheld laser lighting unit according to claim 1, wherein said at least one laser comprises:
   (a) a green laser;
   (b) a red laser; and
   (c) a laser selection switch for alternately connecting said power supply to said green laser and said red laser.

4. The handheld laser lighting unit according to claim 1, wherein said line generating means comprises a plano-convex cylindrical lens which has an aspherical convex cylindrical surface for generating a laser line which is uniformly illuminated from end to end.

5. The handheld laser lighting unit according to claim 1, wherein said case comprises a pistol grip case.

6. The handheld laser lighting unit according to claim 5, wherein said switch means comprises a trigger switch.

7. The handheld laser lighting unit according to claim 5, wherein said case further comprises a lanyard.

8. The handheld laser lighting unit according to claim 1, wherein said power supply comprises at least one battery.

9. The handheld laser lighting unit according to claim 1, wherein said power supply comprises a rechargeable battery pack.

10. A handheld laser flare for providing radiation along a surface comprising:
    (a) a cylindrical case;
    (b) a power supply disposed in said case;
    (c) a laser diode disposed in said case;
    (d) switch means for connecting and disconnecting said power supply to said laser; and
    (e) a plano-convex cylindrical lens which has an aspherical convex cylindrical surface for generating a laser line which is uniformly illuminated from end to end;
wherein said case is sized and dimensioned for transport and use with a single hand.

11. The handheld laser flare according to claim 10, wherein said power supply comprises a single six volt battery.

12. The handheld laser flare according to claim 10, wherein said power supply comprises a plurality of AA size batteries connected in series.

13. The handheld laser flare according to claim 10, wherein said switch comprises a plunger switch disposed in said case.

14. The handheld laser flare according to claim 13, further comprising a threaded end cap removably attached to said case and disposed over said plunger switch.

15. The handheld laser flare according to claim 14, further comprising:
    (a) a first waterproof seal disposed between said lens and said case;
    (b) a second waterproof seal disposed between said plunger and said case; and
    (c) a third waterproof seal disposed between said end cap and said case.

16. The handheld laser flare according to claim 10, further comprising waterproof seal means for protecting said power supply, said laser diode, said switch means, and said lens from damage and corrosion by exposure to water.

17. The handheld laser flare according to claim 10, wherein said switch means comprises a rotary switch electrically connected to said battery and said laser diode.

18. The handheld laser flare according to claim 10, wherein said cylindrical case further comprises:
    (a) a case body;
    (b) a rotating head, the head being rotatably attached to said case body;
    (c) a detent mechanism disposed between said case body and said rotating head; and
    (d) wherein said switch means further comprises a first contact plate disposed in said case body and electrically connected to said power supply, and a second contact plate disposed in said rotating head and electrically connected to said laser diode, said rotating head being rotatable between a first detent position in which the first and second contact plates are electrically connected to supply electrical power to said laser diode, and a second detent position in which the first and second contact plates are electrically disconnected to remove electrical power from said laser diode.

19. The handheld laser flare according to claim 18, wherein said case body has an externally threaded end adapted for attachment to an end of a flashlight, the flare further comprising a battery contact spring extending from the threaded end of said case body.

* * * * *